(12) United States Patent
Drobe et al.

(10) Patent No.: US 9,411,170 B2
(45) Date of Patent: Aug. 9, 2016

(54) PROCESS FOR DETERMINING A PAIR OF PROGRESSIVE OPHTHALMIC LENSES

(71) Applicant: ESSILOR INTERNATIONAL (COMPAGNIE GENERALE D'OPTIQUE), Charenton le Pont (FR)

(72) Inventors: Björn Drobe, Charenton le Pont (FR); Paulyn Ng Hwei Kien, Charenton le Pont (FR); Aude Contet, Charenton le Pont (FR)

(73) Assignee: ESSILOR INTERNATIONAL (COMPAGNIE GENERALE D'OPTIQUE), Charenton le Pont (FR)

( * ) Notice: Subject to any disclaimer, the term of this patent is extended or adjusted under 35 U.S.C. 154(b) by 92 days.

(21) Appl. No.: 14/399,874

(22) PCT Filed: Jun. 28, 2013

(86) PCT No.: PCT/EP2013/063603
§ 371 (c)(1),
(2) Date: Nov. 7, 2014

(87) PCT Pub. No.: WO2014/001491
PCT Pub. Date: Jan. 3, 2014

(65) Prior Publication Data
US 2015/0109575 A1    Apr. 23, 2015

(30) Foreign Application Priority Data
Jun. 29, 2012    (EP) .................................... 12305773

(51) Int. Cl.
*G02C 7/02*    (2006.01)
*G02C 7/06*    (2006.01)

(52) U.S. Cl.
CPC ................ *G02C 7/027* (2013.01); *G02C 7/022* (2013.01); *G02C 7/063* (2013.01)

(58) Field of Classification Search
None
See application file for complete search history.

(56) References Cited

U.S. PATENT DOCUMENTS

2009/0244480 A1* 10/2009 De Gaudemaris ....... G02C 7/02
                                                         351/159.41
2010/0097570 A1    4/2010 Katzman et al.

FOREIGN PATENT DOCUMENTS

EP    2 369 403    9/2011

OTHER PUBLICATIONS

Hsuan-Chih Chen et al., "The effective visual field in reading Chinese", Reading and Writing, vol. 10, No. 3/5, pp. 245-254, Jan. 1, 1998.

* cited by examiner

*Primary Examiner* — Darryl J Collins
*Assistant Examiner* — Journey Sumlar
(74) *Attorney, Agent, or Firm* — Cozen O'Connor

(57) ABSTRACT

The visual perception of a lens wearer is not only along the gaze direction, but also has a non-zero transverse extension, which is called perceptual span. Perceptual span is skewed to extend further in the reading direction, i.e., the line portion to be read next relative to the line portion that was just read. A technique is provided that determines a pair of progressive ophthalmic lenses that take such perceptual span into account.

14 Claims, 16 Drawing Sheets

PROCESS FOR DETERMINING A PAIR OF PROGRESSIVE OPHTHALMIC LENSES

RELATED APPLICATIONS

This application is a U.S. National Phase Application under 35 USC 371 of International Application PCT/EP2013/063603 filed Jun. 28, 2013.

This application claims the priority of European application No. 12305773.9 filed Jun. 29, 2012, the entire content of which is hereby incorporated by reference.

FIELD OF THE INVENTION

The invention relates to a process for determining a pair of progressive ophthalmic lenses. The invention further relates to a process for determining a pair of personalized progressive ophthalmic lenses, a pair of progressive ophthalmic lenses and a computer program product associated to these processes.

BACKGROUND OF THE INVENTION

A wearer may be prescribed a positive or negative optical power correction. For presbyopic wearers, the value of the power correction is different for far vision and near vision, due to the difficulties of accommodation in near vision. The prescription thus comprises a far-vision power value and an addition representing the power increment between far vision and near vision. The addition is qualified as prescribed addition. Ophthalmic lenses suitable for presbyopic wearers are multifocal lenses, the most suitable being progressive multifocal lenses.

Actually, the vision perception of a lens wearer is not limited to the objects which are located along the gaze direction of the wearer at one moment. The wearer also perceives simultaneously objects which are shifted transversally with respect to the gaze direction, although these latter objects are not fixated by the wearer. The whole range of the visual perception of the wearer relating to one and same gaze direction has therefore a non-zero transverse extension, which is called perceptual span in the art.

But the perceptual span is not distributed symmetrically with respect to the gaze direction. This is so in particular when the wearer is reading. Indeed, it is well-known that the perceptual span extends further parallel to the text line in the direction of the text to be read just after that located along the gaze direction. Put another way, the whole vision field extends further in the direction of the next line portion to be read, from the current gaze direction, as compared to the direction of the line portion already just read.

However, current lens designs do not take into account such perceptual span.

SUMMARY OF THE INVENTION

An object of the present invention is to improve the comfort of wearing a pair of ophthalmic lenses for the wearer, in particular when reading.

A process for determining a pair of progressive ophthalmic lenses is thus proposed. The process comprises:
- determining a prescribed far vision mean power for each lens of the pair;
- determining a prescribed addition for each lens of the pair;
- determining a reading direction for the wearer of the lenses;
- defining a temporal side and a nasal side on each lens of the pair;
- defining, on each lens being worn and for each gaze direction, a refractive power and a module of resulting astigmatism, each gaze direction corresponding to a lowering angle and to an azimuth angle;
- defining a proximate vision gaze direction for each lens of the pair;
- defining, for each lens of the pair, a temporal half-width field of refractive power as the angular distance, at constant lowering angle, between the proximate vision gaze direction and a gaze direction on the temporal side of the lens where the refractive power reaches the value of the prescribed far vision mean power plus three quarters of the prescribed addition;
- defining, for each lens of the pair, a nasal half-width field of refractive power as the angular distance, at constant lowering angle, between the proximate vision gaze direction and gaze direction on the nasal side of the lens where the refractive power reaches the value of the prescribed far vision mean power plus three quarters of the prescribed addition;
- defining, for each lens of the pair, a temporal half-width field of module of resulting astigmatism as the angular distance, at constant lowering angle, between the proximate vision gaze direction and a gaze direction on the temporal side of the lens where the module of resulting astigmatism reaches the value of one quarter of the prescribed addition;
- defining, for each lens of the pair, a nasal half-width field of module of resulting astigmatism as the angular distance, at constant lowering angle, between the proximate vision gaze direction and a gaze direction on the nasal side of the lens where the module of resulting astigmatism reaches the value of one quarter of the prescribed addition.

The ratio of the difference over the sum of temporal and nasal half-width fields of refractive power and/or the ratio of the difference over the sum of temporal and nasal half-width fields of module of resulting astigmatism are determined for each lens of the pair based on the reading direction for the wearer.

In preferred implementations of the invention, the ratio of the difference over the sum of temporal and nasal half-width fields of refractive power and/or the ratio of the difference over the sum of temporal and nasal half-width fields of module of resulting astigmatism, may be determined for each lens of the pair according to the following rules:
- if the reading direction determined for the wearer is left-to-right, then the ratio of the difference over the sum of temporal and nasal half-width fields of refractive power and/or resulting astigmatism is negative for the left eye lens, and positive for the right eye lens; and
- if the reading direction determined for the wearer is right-to-left, then the ratio of the difference over the sum of temporal and nasal half-width fields of refractive power and/or resulting astigmatism is positive for the left eye lens, and negative for the right eye lens.

Hence, the design of each lens of the pair is adapted based on the reading direction.

Further improvements of the invention deal with quantifying the design adaptation of each lens of the pair.

Advantageously, the process may further comprise determining a perceptual span effective for the wearer when looking in a gaze direction, and an azimuth shift between a center direction of the perceptual span and the gaze direction. Then, an absolute value of the ratio of the difference over the sum of temporal and nasal half-width fields of refractive power, for each lens, may be an increasing function of an absolute value of the azimuth shift between the center direction of the perceptual span and the gaze direction.

In further improved implementations of the invention, the near vision zone of each progressive lens of the pair may be substantially centered with respect to the perceptual span when the wearer's gaze direction is the proximate vision gaze direction for this lens. To this end, the ratio of the difference over the sum of temporal and nasal half-width fields of refractive power, for each lens, may be determined so that, when the gaze direction of the wearer is the proximate vision gaze direction, then for the lens the center direction of the perceptual span, and an average direction of the gaze directions respectively on the temporal side and the nasal side of the lens, where the refractive power reaches the value of the prescribed far vision mean power plus three quarters of the prescribed addition, at constant lowering angle equal to that of the proximate vision gaze direction may have an absolute difference of less than 10%, or more preferably less than 5%, of the absolute difference between the gaze directions respectively on the temporal side and the nasal side of the lens, where the refractive power reaches the value of the prescribed far vision mean power plus three quarters of the prescribed addition, at constant lowering angle.

In addition, the design of each lens may be further adapted depending on the type of the language which is read by the lens wearer. To this end, the process may further comprise determining whether a language used by the wearer in accordance with the reading direction determined is based on alphabetical or logogram orthography. Then, the perceptual span which is determined for the wearer may be lower for a logogram orthography-based language than for an alphabetical orthography-based language. As a consequence of the shorter perceptual span for a logogram-based language, the azimuth shift between the center direction of the perceptual span and the current gaze direction may be shorter too. This shorter shift may result in turn in a smaller absolute value for the ratio of the difference over the sum of the temporal and nasal half-width fields, due to the increasing function which connects the azimuth shift between the center direction of the perceptual span and the current gaze direction to the absolute ratio of the difference over the sum of the temporal and nasal half-width fields.

Most implementations of the invention are still improved when the respective designs of both lenses of the pair are adapted with similar shifts of the near vision zones towards either the right side of the wearer or his left side. Put another way, the sum of the ratio of the difference over the sum of temporal and nasal half-width fields of refractive power for the right-eye lens and that for the left-eye lens may be set substantially to zero.

Although all the above improvements of the invention have just been disclosed using the half-width fields defined from the refractive power, these improvements may be expressed similarly based on the half-width fields defined from the resulting astigmatism. Then the concerned value for the resulting astigmatism is one quarter of the prescribed addition for determining the limits of the half-width fields.

The proximate vision gaze direction may be defined, for each lens of the pair, as the gaze direction where the refractive power reaches the prescribed far vision mean power plus 100%, or only 85%, of the prescribed addition for said lens of the pair.

Another aspect of the invention also relates to a pair of progressive ophthalmic lenses, in which each lens of the pair has a prescribed far vision mean power and a prescribed addition, and comprises a temporal side and a nasal side and a proximate vision control point defined on the front surface. Each lens of the pair has a refractive power and a module of resulting astigmatism, when worn and for each gaze direction corresponding to a lowering angle and to an azimuth angle. For such lens pair of the invention, a ratio of the difference over the sum of temporal and nasal half-width fields of refractive power value is positive for one of the lenses of the pair and negative for the other lens of the pair, and/or a ratio of the difference over the sum of temporal and nasal half-width fields of module of resulting astigmatism is positive for one of the lenses of the pair and negative for the other lens of the pair. Definitions of the temporal/nasal half-width fields of refractive power/resulting astigmatism are the same as above.

Further, for respectively each lens of the pair, $\Delta<10\%$, with $\Delta=100*abs(Max\_Asr\_N-Max\_Asr\_T)/Max(Max\_Asr\_N;Max\_Asr\_T)$, abs: absolute value, Max_Asr_N: maximum value of resulting astigmatism found over an area of the lens defined by all gaze directions which are comprised:

within the nasal area of the lens, and within a zone centered on the gaze direction passing through the PRP (Prism reference point) and containing all gaze directions $(\alpha,\beta)$ respecting the following inequality $(\alpha^2+\beta^2)^{1/2} \leq 40°$, Max_Asr_T: maximum value of resulting astigmatism found over an area of the lens defined by all gaze directions which are comprised:

within the temporal area of the lens, and within a zone centered on the gaze direction passing through the PRP (Prism reference point) and containing all gaze directions $(\alpha,\beta)$ respecting the following inequality $(\alpha^2+\beta^2)^{1/2} \leq 40°$, Max(x;y): maximal value of x and y.

Such pair of progressive ophthalmic lenses may be determined using a process as described above, including the invention improvements recited.

Yet another aspect of the invention also relates to a computer program product which comprises one or more stored sequences of instructions accessible to a processor and which, when executed by the processor, causes the processor to carry out the steps of a process as defined above.

Further features and advantages of the invention will appear from the following description of embodiments of the invention, given as non-limiting examples, with reference to the accompanying drawings listed hereunder.

BRIEF DESCRIPTION OF THE DRAWINGS

FIG. 10b corresponds to FIG. 10a for a reading direction opposite to that of FIG. 10a;

FIGS. 11 to 14 display optical characteristics for a first example of lens pair corresponding to FIG. 10a;

Figure 1:
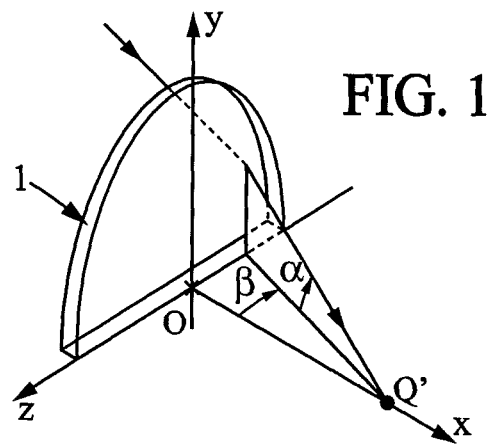
FIGS. 1 and 2 show schematically optical systems of eye and lens.

It can be appreciated that elements in the figures are illustrated for simplicity and clarity and have not necessarily been drawn to scale. For example, the dimensions of some of the elements in the figures may be exaggerated relatively to other elements to help improving the understanding of the embodiments of the present invention.

DETAILED DESCRIPTION OF PREFERRED EMBODIMENTS

A process for determining a pair of progressive ophthalmic lenses is proposed. This process enables to adapt the near vision zones according to the reading direction of the wearer, thus resulting in an increased comfort for the wearer, particularly when performing near vision tasks.

A progressive lens comprises two non-rotationally symmetrical aspheric surfaces, for instance but not limited to, progressive surface, regressive surface, toric or atoric surfaces.

As is known, a minimum curvature $CURV_{min}$ is defined at any point on an aspherical surface by the formula:

$$CURV_{min} = \frac{1}{R_{max}}$$

where $R_{max}$ is the local maximum radius of curvature, expressed in meters and $CURV_{min}$ is expressed in dioptres.

Similarly, a maximum curvature $CURV_{max}$ can be defined at any point on an aspheric surface by the formula:

$$CURV_{max} = \frac{1}{R_{min}}$$

where $R_{min}$ is the local minimum radius of curvature, expressed in meters and $CURV_{max}$ is expressed in dioptres.

It can be noticed that when the surface is locally spherical, the local minimum radius of curvature $R_{min}$ and the local maximum radius of curvature $R_{max}$ are the same and, accordingly, the minimum and maximum curvatures $CURV_{min}$ and $CURV_{max}$ are also identical. When the surface is aspherical, the local minimum radius of curvature $R_{min}$ and the local maximum radius of curvature $R_{max}$ are different.

From these expressions of the minimum and maximum curvatures $CURV_{min}$ and $CURV_{max}$, the minimum and maximum spheres labeled $SPH_{min}$ and $SPH_{max}$ can be deduced according to the kind of surface considered.

When the surface considered is the object side surface, the expressions are the following:

$$SPH_{min} = (n-1) * CURV_{min} = \frac{n-1}{R_{max}} \text{ and}$$

$$SPH_{max} = (n-1) * CURV_{max} = \frac{n-1}{R_{min}}$$

where n is the index of the constituent material of the lens.

If the surface considered is an eyeball side surface, the expressions are the following:

$$SPH_{min} = (1-n) * CURV_{min} = \frac{1-n}{R_{max}} \text{ and}$$

$$SPH_{max} = (1-n) * CURV_{max} = \frac{1-n}{R_{min}}$$

where n is the index of the constituent material of the lens.

As it is known, a mean sphere $SPH_{mean}$ at any point on an aspherical surface can also be defined by the formula:

$$SPH_{mean} = \frac{1}{2}(SPH_{min} + SPH_{max})$$

The expression of the mean sphere therefore depends on the surface considered:

if the surface is the object side surface, $$SPH_{mean} = \frac{n-1}{2}\left(\frac{1}{R_{min}} + \frac{1}{R_{max}}\right)$$

if the surface is an eyeball side surface, $$SPH_{mean} = \frac{1-n}{2}\left(\frac{1}{R_{min}} + \frac{1}{R_{max}}\right)$$

A cylinder CYL is also defined by the formula $CYL = |SPH_{max} - SPH_{min}|$.

The characteristics of any aspherical face of the lens may be expressed by means of the local mean spheres and cylinders. A surface can be considered as locally aspherical when the cylinder is at least 0.25 diopters.

For an aspherical surface, a local cylinder axis $\gamma_{AX}$ may further be defined.

The cylinder axis $\gamma_{AX}$ is the angle of the orientation of the maximum curvature $CURV_{max}$ with relation to a reference axis and in the chosen direction of rotation. In the TABO convention, the reference axis is horizontal (the angle of this reference axis is 0°) and the direction of rotation is counter-clockwise for each eye, when looking to the wearer ($0° \leq \gamma_{AX} \leq 180°$). An axis value for the cylinder axis $\gamma_{AX}$ of +45° therefore represents an axis oriented obliquely, which when looking to the wearer, extends from the quadrant located up on the right to the quadrant located down on the left.

A surface may thus be locally defined by a triplet constituted by the maximum sphere $SPH_{max}$, the minimum sphere $SPH_{min}$ and the cylinder axis $\gamma_{AX}$. Alternatively, the triplet may be constituted by the mean sphere $SPH_{mean}$, the cylinder CYL and the cylinder axis $\gamma_{AX}$.

Figure 4:
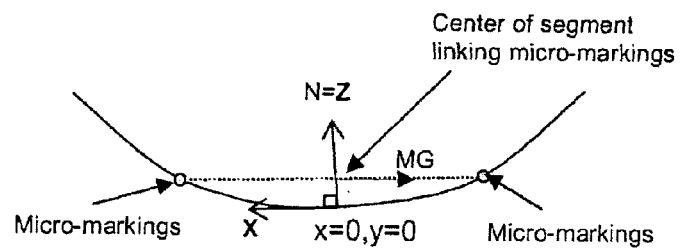
FIGS. 4 and 5 show referentials defined with respect to micro-markings, respectively for a surface bearing micro-markings and for a surface not bearing the micro-markings respectively.
Figure 5:
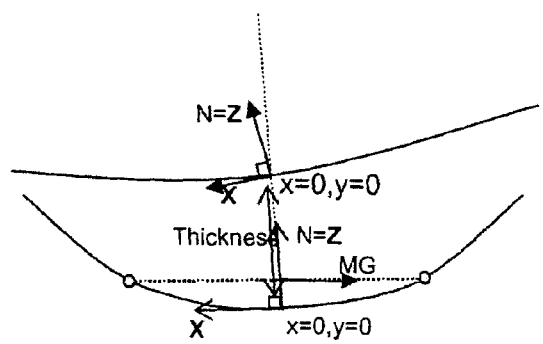

Whenever a lens is characterized by reference to one of its aspherical surfaces, a referential is defined with respect to micro-markings as illustrated in FIGS. 4 and 5, for a surface bearing micro-markings and for a surface not bearing the micro-markings respectively.

Progressive lenses comprise micro-markings that have been made mandatory by the harmonized standard ISO 8990-

2. Temporary markings may also be applied on the surface of the lens, indicating positions of control points on the lens, such as a control point for far vision, a control point for near vision, a prism reference point and a fitting cross for instance. If the temporary markings are absent or have been erased, it is always possible for a skilled person to position the control points on the lens by using a mounting chart and the permanent micro-markings.

The micro-markings also make it possible to define referential for both surfaces of the lens.

FIG. 4 shows the referential for the surface bearing the micro-markings. The center of the surface (x=0, y=0) is the point of the surface at which the normal N to the surface intersect the center of the segment linking the two micro-markings. MG is the collinear unitary vector defined by the two micro-markings. Vector Z of the referential is equal to the unitary normal (Z=N); vector Y of the referential is equal to the vector product of Z by MG; vector X of the referential is equal to the vector product of Y by Z. {X, Y, Z} thereby form a direct orthonormal trihedral. The center of the referential is the center of the surface x=0 mm, y=0 mm.

FIG. 5 shows the referential for the surface opposite to the surface bearing the micro-markings. The center of this second surface (x=0, y=0) is the point at which the normal N intersecting the center of the segment linking the two micro-markings on the first surface intersects the second surface. Referential of the second surface is constructed the same way as the referential of the first surface, i.e. vector Z is equal to the unitary normal of the second surface; vector Y is equal to the vector product of Z by MG; vector X is equal to the vector product of Y by Z. The center of the referential of the surface is also x=0 mm, y=0 mm.

Similarly, on a semi-finished lens blank, standard ISO 10322-2 requires micro-markings to be applied. The center of the aspherical surface of a semi-finished lens blank can therefore be determined as well as a referential as described above.

Moreover, a progressive multifocal lens may also be defined by optical characteristics, taking into consideration the situation of the person wearing the lenses.

Figure 2:
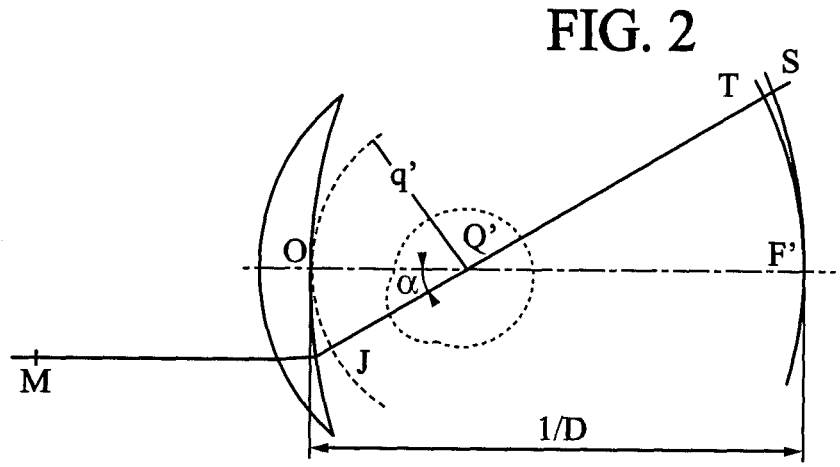

FIGS. 1 and 2 are diagrammatic illustrations of optical systems of eye and lens, thus showing the definitions used in the description. More precisely, FIG. 1 represents a perspective view of such a system illustrating parameters α and β used to define a gaze direction. FIG. 2 is a view in the vertical plane parallel to the antero-posterior axis of the wearer's head and passing through the center of rotation of the eye in the case when the parameter β is equal to 0.

The center of rotation of the eye is labeled Q'. The axis Q'F', shown on FIG. 2 in a dot-dash line, is the horizontal axis passing through the center of rotation of the eye and extending in front of the wearer—that is the axis Q'F' corresponding to the primary gaze view. This axis cuts the aspherical surface of the lens on a point called the fitting cross, which is present on lenses to enable the positioning of lenses in a frame by an optician. The point of intersection of the rear surface of the lens and the axis Q'F' is the point O. O can be the fitting cross if it is located on the rear surface. An apex sphere, of center Q', and of radius q', which is tangential to the rear surface of the lens in a point of the horizontal axis. As examples, a value of radius q' of 25.5 mm corresponds to a usual value and provides satisfying results when wearing the lenses.

A given gaze direction—represented by a solid line on FIG. 1—corresponds to a position of the eye in rotation around Q' and to a point J (see FIG. 2) of the apex sphere; the angle β is the angle formed between the axis Q'F' and the projection of the straight line Q'J on the horizontal plane comprising the axis Q'F'; this angle appears on the scheme on FIG. 1. The angle α is the angle formed between the axis Q'J and the projection of the straight line Q'J on the horizontal plane comprising the axis Q'F'; this angle appears on the scheme on FIGS. 1 and 2. A given gaze view thus corresponds to a point J of the apex sphere or to a couple (α, β). The more the value of the lowering gaze angle is positive, the more the gaze is lowering and the more the value is negative, the more the gaze is rising.

In a given gaze direction, the image of a point M in the object space, located at a given object distance, is formed between two points S and T corresponding to minimum and maximum distances JS and JT, which would be the sagittal and tangential local focal lengths. The image of a point in the object space at infinity is formed, at the point F'. The distance D corresponds to the rear frontal plane of the lens.

Ergorama is a function associating to each gaze direction the usual distance of an object point. Typically, in far vision following the primary gaze direction, the object point is at infinity. In near vision, following a gaze direction essentially corresponding to an angle α of the order of 35° and to an angle β of the order of 5° in absolute value towards the nasal side, the object distance is of the order of 30 to 50 cm. For more details concerning a possible definition of an ergorama, U.S. Pat. No. 6,318,859 may be considered. This document describes an ergorama, its definition and its modeling method. For a method of the invention, points may be at infinity or not. Ergorama may be a function of the wearer's ametropia.

Using these elements, it is possible to define a wearer optical power and astigmatism, in each gaze direction. An object point M at an object distance given by the ergorama is considered for a gaze direction (α,β). An object proximity ProxO is defined for the point M on the corresponding light ray in the object space as the inverse of the distance MJ between point M and point J of the apex sphere:

$$ProxO = 1/MJ$$

This enables to calculate the object proximity within a thin lens approximation for all points of the apex sphere, which is used for the determination of the ergorama. For a real lens, the object proximity can be considered as the inverse of the distance between the object point and the front surface of the lens, on the corresponding light ray.

For the same gaze direction (α,β), the image of a point M having a given object proximity is formed between two points S and T which correspond respectively to minimal and maximal focal distances (which would be sagittal and tangential focal distances). The quantity Prox I is called image proximity of the point M:

$$ProxI = \frac{1}{2}\left(\frac{1}{JT} + \frac{1}{JS}\right)$$

The optical power is also called refractive power

By analogy with the case of a thin lens, it can therefore be defined, for a given gaze direction and for a given object proximity, i.e. for a point of the object space on the corresponding light ray, an optical power Pui as the sum of the image proximity and the object proximity.

$$Pui = ProxO + ProxI$$

With the same notations, an astigmatism Ast is defined for every gaze direction and for a given object proximity as:

$$Ast = \left| \frac{1}{JT} - \frac{1}{JS} \right|$$

This definition corresponds to the astigmatism of a ray beam created by the lens.

Possible definitions of the optical power and the astigmatism of the lens, in the wearing conditions, can thus be calculated as explained in the article by B. Bourdoncle et al., entitled "Ray tracing through progressive ophthalmic lenses", 1990 International Lens Design Conference, D. T. Moore ed., Proc. Soc. Photo. Opt. Instrum. Eng. Standard wearing conditions are to be understood as the position of the lens with relation to the eye of a standard wearer, notably defined by a pantoscopic angle of −8°, a lens-pupil distance of 12 mm, a pupil-eye rotation center of 13.5 mm and a wrap angle of 0°. The pantoscopic angle is the angle in the vertical plane between the optical axis of the spectacle lens and the visual axis of the eye in the primary position, usually taken to be the horizontal. The wrap angle is the angle in the horizontal plane between the optical axis of the spectacle lens and the visual axis of the eye in the primary position, usually taken to be the horizontal. Other conditions may be used. Wearing conditions may be calculated from a ray-tracing program, for a given lens. Further, the optical power and the astigmatism may be calculated so that the prescription is either fulfilled at the reference points (i.e control points in far vision) and for a wearer wearing his spectacles in the wearing conditions or measured by a frontofocometer.

Figure 3:
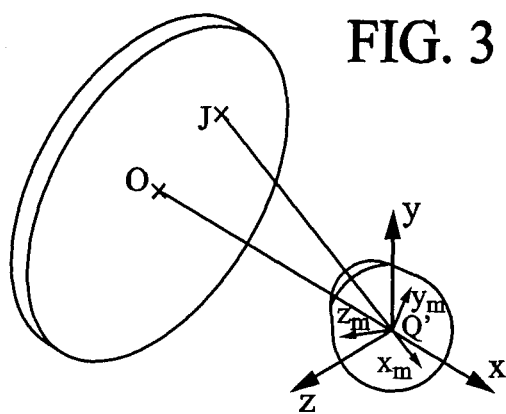
FIG. 3 shows a ray tracing from the center of rotation of the eye.

FIG. 3 represents a perspective view of a configuration wherein the parameters $\alpha$ and $\beta$ are non zero. The effect of rotation of the eye can thus be illustrated by showing a fixed frame $\{x, y, z\}$ and a frame $\{x_m, y_m, z_m\}$ linked to the eye. Frame $\{x, y, z\}$ has its origin at the point Q'. The axis x is the axis Q'O and it is orientated from the lens towards the eye. The y axis is vertical and orientated upwardly. The z axis is such that the frame $\{x, y, z\}$ is orthonormal and direct. The frame $\{x_m, y_m, z_m\}$ is linked to the eye and its center is the point Q'. The $x_m$ axis corresponds to the gaze direction JQ'. Thus, for a primary gaze direction, the two frames $\{x, y, z\}$ and $\{x_m, y_m, z_m\}$ are the same. It is known that the properties for a lens may be expressed in several different ways and notably in surface and optically. A surface characterization is thus equivalent to an optical characterization. In the case of a blank, only a surface characterization may be used. It has to be understood that an optical characterization requires that the lens has been machined to the wearer's prescription. In contrast, in the case of an ophthalmic lens, the characterization may be of a surface or optical kind, both characterizations enabling to describe the same object from two different points of view. Whenever the characterization of the lens is of optical kind, it refers to the ergorama-eye-lens system described above. For simplicity, the term 'lens' is used in the description but it has to be understood as the 'ergorama-eye-lens system'. The value in surface terms can be expressed with relation to points. The points are located with the help of abscissa or ordinate in a frame as defined above with respect to FIGS. 4 and 5.

The values in optic terms can be expressed for gaze directions. Gaze directions are usually given by their degree of lowering and azimuth in a frame whose origin is the center of rotation of the eye. When the lens is mounted in front of the eye, a point called the fitting cross is placed before the pupil or before the eye rotation center Q' of the eye for a primary gaze direction. The primary gaze direction corresponds to the situation where a wearer is looking straight ahead. In the chosen frame, the fitting cross corresponds thus to a lowering angle $\alpha$ of 0° and an azimuth angle $\beta$ of 0° whatever surface of the lens the fitting cross is positioned—rear surface or front surface.

The above description made with reference to FIGS. 1-3 was given for central vision. In peripheral vision, as the gaze direction is fixed, the center of the pupil is considered instead of center of rotation of the eye and peripheral ray directions are considered instead of gaze directions. When peripheral vision is considered, angle $\alpha$ and angle $\beta$ correspond to ray directions instead of gaze directions.

In the remainder of the description, terms like <<up>>, <<bottom>>, <<horizontal>>, <<vertical>>, <<above>>, <<below>>, or other words indicating relative position may be used. These terms are to be understood in the wearing conditions of the lens. Notably, the "upper" part of the lens corresponds to a negative lowering angle $\alpha<0°$ and the "lower" part of the lens corresponds to a positive lowering angle $\alpha>0°$. Similarly, the "upper" part of the surface of a lens—or of a semi-finished lens blank—corresponds to a positive value along the y axis, and preferably to a value along the y axis superior to the y_value at the fitting cross and the "lower" part of the surface of a lens—or of a semi-finished lens blank—corresponds to a negative value along the y axis in the frame as defined above with respect to FIGS. 4 and 5, and preferably to a value along the y axis inferior to the y_value at the fitting cross.

Figure 6:
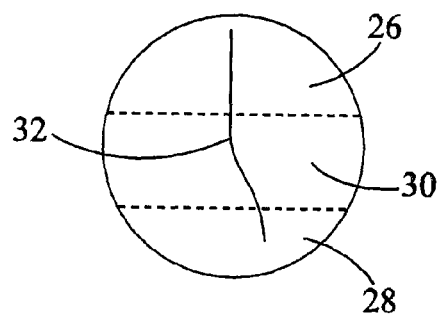
FIGS. 6 and 7 show field vision zones of a lens.
Figure 7:
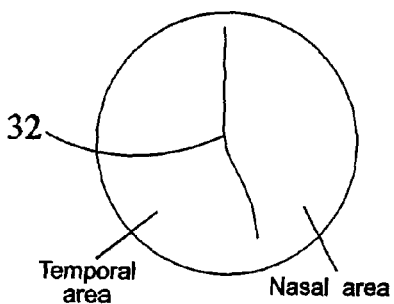

The visual field zones seen through a lens are schematically illustrated in FIGS. 6 and 7. The lens comprises a far vision zone 26 located in the upper part of the lens, a near vision zone 28 located in the lower part of the lens and an intermediate zone 30 situated in the lower part of the lens between the far vision zone 26 and the near vision zone 28. The lens also has a main meridian 32 passing through the three zones and defining a nasal side and a temporal side.

The prescription in ophthalmic field may comprise, in addition to the power prescription, an astigmatism prescription. Such a prescription is composed of an axis value (in degree) and a module value (in diopters). The module value represents the difference between the maximal and minimal power in a given direction allowing to correct the visual default of a wearer. Following the convention, the axis represents the orientation of one of the two powers versus a reference axis and following a given rotation direction. TABO convention may be used. In this convention the reference axis is horizontal and the rotation direction is counterclockwise when looking at the wearer. A 45° axis corresponds to an axis orientated obliquely linking, when looking at the wearer, the upper right quadrant to the lower left quadrant. Such an astigmatism prescription is measured for the wearer in far vision. We use the term 'astigmatism' to refer to the couple (module, axis). That term is sometimes used to designate simply the module. The skilled person easily understands what it refers to depending on the context. The skilled person is also aware that the power/astigmatism prescription for a wearer is commonly described with the terms sphere, cylinder and axis.

So we can define the prescribed far vision mean power value ($P_{FV}$) as the power prescribed plus half of the module of prescribed astigmatism.

The resulting astigmatism is defined as the difference between a prescribed astigmatism and the astigmatism generated by the working lens in the reference frame associated with the eye, and for each direction of glance. Resulting astigmatism may also be called residual astigmatism.

For the purpose of the invention, the meridian line 32 of a progressive lens may be defined as follow: for each lowering of the view of an angle $\alpha=\alpha_1$ between the gaze direction corresponding to the fitting cross and the bottom of the lens, the gaze direction ($\alpha_1, \beta_1$) is searched by ray tracing, in order to be able to see clearly the object point located in the median plane, at the distance determined by the ergorama. The median plane is the median plane of the head, preferentially passing through the base of the nose. This plane may also be passing through the middle of right and left eye rotation centers.

Thus, all the gaze directions defined in that way form the meridian line of the ergorama-eye-lens system. For personalization purpose, postural data of the wearer, such as angle and position of the head in the environment, might be taken into account to determine the object position. For instance, the object position might be positioned out of median plane to modelize a wearer lateral shift in near vision.

The meridian line of the lens represents the locus of mean gaze directions of a wearer when he is looking from far to near visions. The meridian line 32 of a surface of the lens is defined as follow: each gaze direction ($\alpha, \beta$) belonging to the optical meridian line of the lens intersects the surface in a point (x, y). The meridian line of the surface is the set of points corresponding to the gaze directions of the meridian line of the lens.

As shown in FIG. 7, the meridian line 32 separates the lens in a nasal area and a temporal area. As expected, the nasal area is the area of the lens which is between the meridian line and the nose of the wearer whereas the temporal area is the area which is between the meridian line and the temple of the wearer.

The specific near vision task of reading on a sheet of paper is now described with reference to FIGS. 8 and 9.

Figure 8:
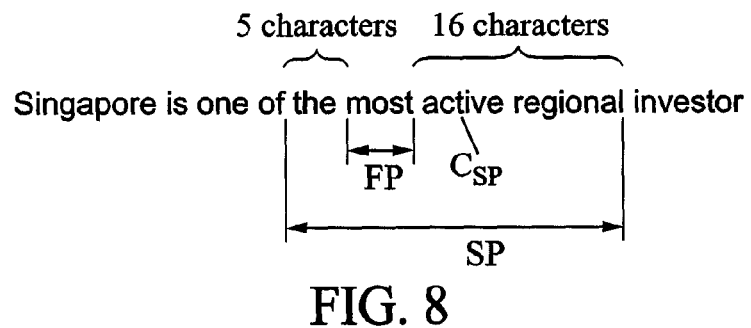
FIG. 8 illustrates a perceptual span for a reading direction and a first language.

FIG. 8 displays a sentence in English language that is to be read. The reading direction is horizontal from left to right. During reading, at the exact moment when the reader's gaze direction is oriented towards the word "most", the reader does not see the whole sentence but only a limited portion thereof. This limited portion is the perceptual span and denoted SP. The line portion which is substantially in line with the proximate vision gaze directions of both eyes, corresponding to the word "most" in the example, is denoted FP. It is much shorter than the perceptual span SP. Obviously, when going on reading, both the line portion FP and the perceptual span SP are progressively shifted towards right side while remaining with constant relative position of other. Due to the reading direction from left to right for English language, the perceptual span SP is not centered with respect to the line portion FP, but shifted towards right side. In particular, when each printed character has a size corresponding to 0.3° of azimuth variation, the perceptual span SP extends further from the line portion FP on the left side, with a left extension length equal to about five printed characters. On right side, the perceptual span SP extends further from the line portion FP with a right extension length that is equal to about sixteen printed characters. $C_{SP}$ denotes the center point of the perceptual span SP. It is shifted towards right side with respect to the line portion FP in the example, but this shift direction may vary, in particular depending on the reading direction of the language considered in place of the English language.

So as a general rule, the line portion which is currently read is located at the intersection of the respective proximate vision gaze directions of both eyes, and the perceptual span extends asymmetrically on both sides of this direction intersection. Then the present invention proposes to arrange the near vision zone of each lens in a centered position with respect to the perceptual span, for each eye, so that the reader's vision is improved and made more comfortable not only for the proximate vision gaze directions, but also over almost the whole perceptual span. This principle of the invention is illustrated on FIG. 9. FIG. 9 shows the reader's head 10 from backwards, with left ophthalmic lens denoted LE and right ophthalmic lens denoted RE, in position as-worn by the wearer. The respective proximate vision gaze directions through both lenses LE and RE converge onto the word "most" corresponding to the line portion FP currently read. Each proximate vision gaze direction crosses the corresponding lens at point denoted PV, for each one of the left lens LE and right lens RE. Then, the near vision zone in each lens is arranged transversally so as to correspond to the lateral shift of the perceptual span SP with respect to the line portion FP, towards the right side in the example (see FIG. 8). Obviously, each point PV remains within the near vision zone for each lens.

Then, the outlines which are denoted $NZ_{LE}$ and $NZ_{RE}$ show schematically the near vision zone side limits respectively for each lens LE and RE, on nasal side and on temporal side. These side limits are defined with respect to the refractive power values or the resulting astigmatism. Practically for progressive lenses, these side limits of the near vision zone $NZ_{LE}$ and $NZ_{RE}$ may correspond to gaze directions across the lenses where the refractive power equals the value prescribed for far vision plus three quarters of the prescribed addition. Alternatively, the near vision zone side limits $NZ_{LE}$ and $NZ_{RE}$ may correspond to directions across the lenses where the module of resulting astigmatism equals one quarter of the prescribed addition. These two definitions of the channel side limits are almost equivalent, so that the resulting locations of the near vision zone side limits within the lens are almost identical in both cases.

Figure 9:
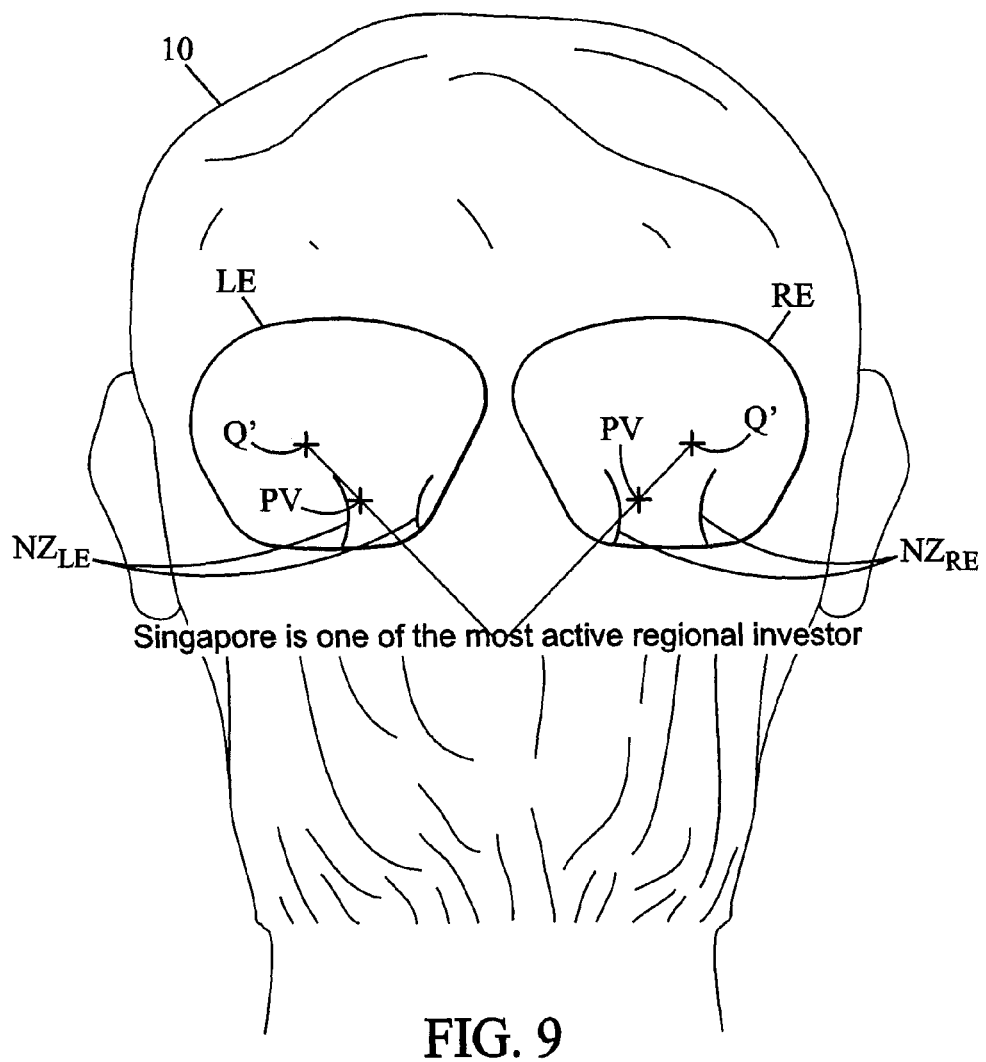
FIG. 9 illustrates the principle of the invention in connection with FIG. 8.

For the reading conditions illustrated in FIG. 9, the near vision zones as indicated by the side limits $NZ_{LE}$ and $NZ_{RE}$ are shifted towards right side of the wearer for both lenses LE and RE. Since points PV are fixed, the PV point of the right lens RE appears to be close to the nasal one of the side limits $NZ_{RE}$ of the near vision zone for this lens, and the PV point for the left lens LE appears close to the temporal side limit $NZ_{RE}$ of the near vision zone for this other lens. Hence, both right and left lenses RE and LE have respective designs which are different from one another, according to the present invention.

Figure 10A:
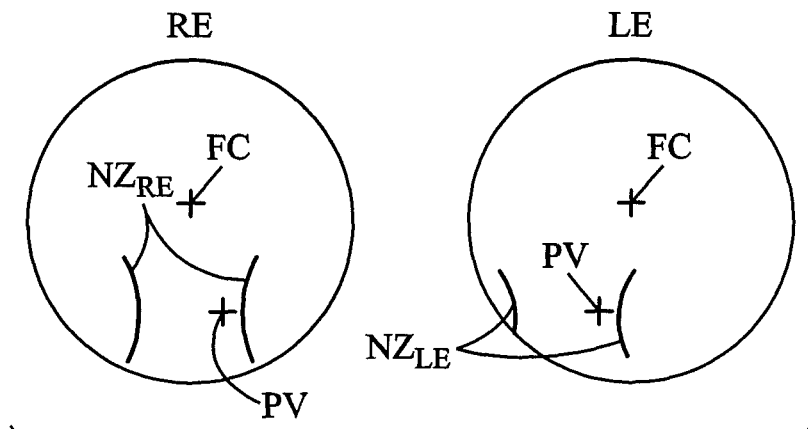
FIG. 10a is a front view of a pair of lenses corresponding to FIG. 9.
Figure 10B:
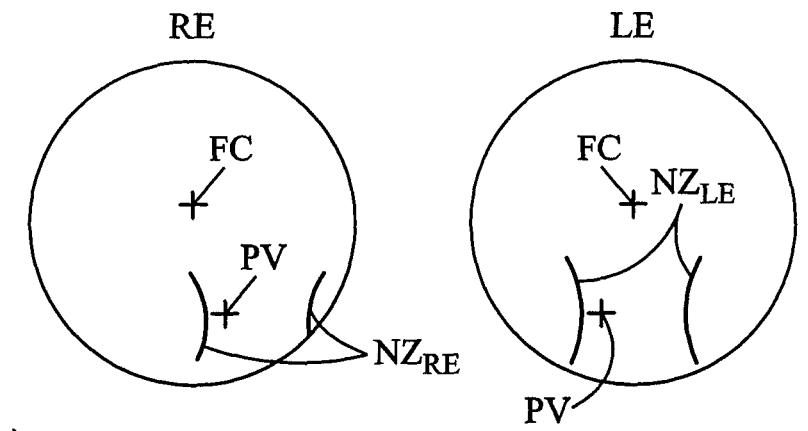
Figure 10C:
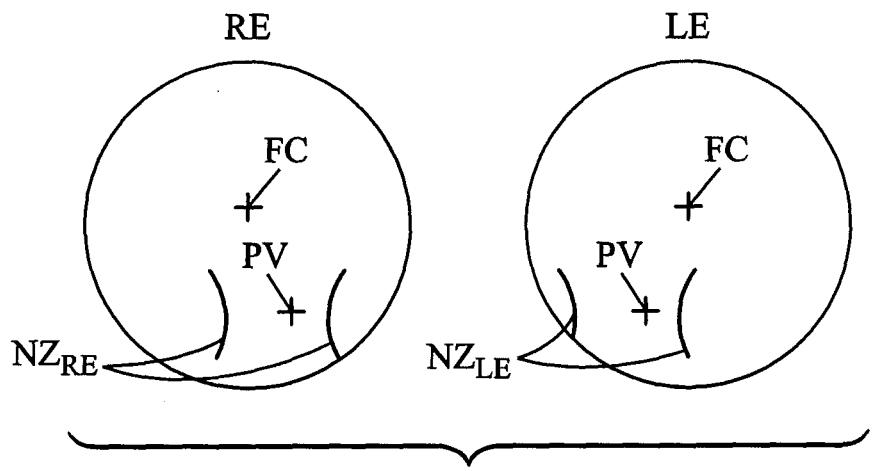
FIG. 10c also corresponds to FIG. 10a, for the same reading direction but for another language.
Figure 11:
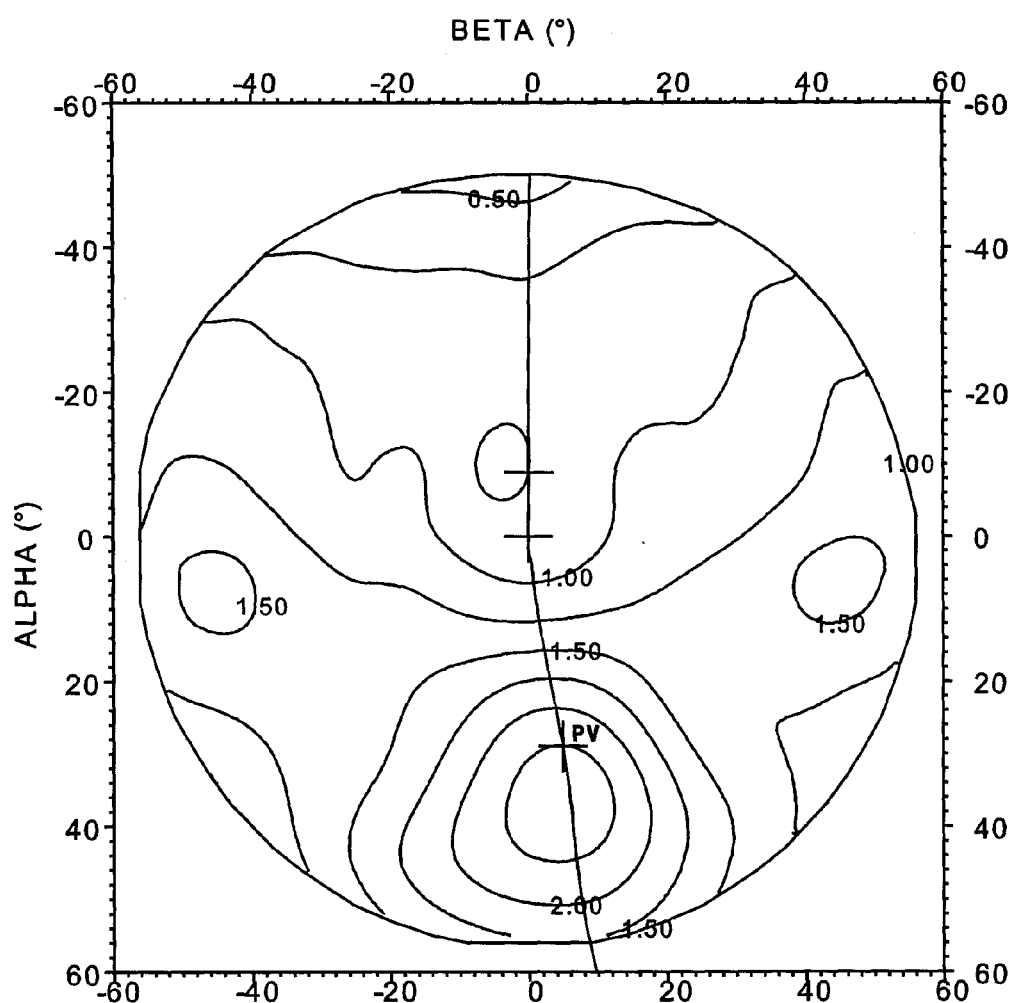

FIGS. 10a to 10c illustrate this principle for three languages, corresponding to varying language features including the reading direction and the character-type. In these figures, the lenses are viewed from their front side and located next to each other by their respective nasal edges, as this is more usual in the art. Therefore, the right lens RE appears on the left side of the figures, and the left lens LE appears on the right side of the figures. The temporal side of each right and left lens is then located on the left and right end-parts of the figures, respectively. The fitting cross is also indicated for each lens, and is denoted FC.

FIG. 10a relates to a first pair of lenses, comprised of the right lens RE and the left lens LE, intended for a first wearer who reads English language as above: left-to-right reading direction and alphabetical orthography. FIG. 10a is thus identical to the lenses of FIG. 9, but viewed from opposite direction.

FIG. 10b relates to a second pair of right and left lenses which is intended for a second wearer who reads another language with right-to-left reading direction but alphabetical orthography again. Such second language may be the Arabic language for example. Due to the inversion in the reading direction as compared to the English language intended to the first lens pair of FIG. 10a, the lenses of the second pair of FIG. 10b are obtained by swapping the locations of the side limits of the near vision zone between right and left lenses. Thus, the temporal one of the side limits $NZ_{RE}$ for the right lens RE is now closer to the proximate vision point PV than the nasal one of the side limits $NZ_{RE}$. The opposite situation applies then to the left lens LE: the nasal one of the side limits $NZ_{LE}$ for the left lens LE is closer to the proximate vision point PV than the temporal one of the side limits $NZ_{LE}$.

Actually, the perceptual span length is almost equal for English and Arabic languages, whereas it is shorter for Chinese language, due to the fact that Chinese language is based on logogram-orthography instead of alphabetical orthography. Indeed, the perceptual span for Chinese language is five logogram characters of 0.9 degree width each, with the proximate vision gaze directions of both eyes converging onto the second character from the left. Thus the perceptual span SP exceeds the line portion currently read FP with one character on the left side and three characters on the right side. Reading direction for Chinese language is left-to-right, as for English language. FIG. 10c shows a third pair of right and left lenses which is intended for a third wearer who reads Chinese language. The designs of the lenses of the third pair is therefore similar to that of the first pair of FIG. 10a, except that the side limits $NZ_{RE}$ and $NZ_{LE}$ are less shifted with respect to the points PV. Put another way, the absolute ratio of the difference over the sum of temporal and nasal half-width fields is smaller in FIG. 10c than in FIG. 10a.

More generally for each lens, the lateral shift of the near vision zone for each lens may advantageously increase as a function of the difference between the gaze direction towards the center point $C_{SP}$ of the perceptual span SP and the proximate vision gaze direction which is oriented towards the middle point of the line portion FP. Such increasing function may be linear when connecting the ratio of the difference over the sum of the temporal and nasal half-width fields to the azimuth difference between the gaze direction towards the center point of the perceptual span and the proximate vision gaze direction. Preferably, the lateral shift of the near vision zone may be set so that this near vision zone is centered with respect to the gaze direction towards the center point $C_{SP}$ of the perceptual span SP.

Hence, the near vision zone of each lens within each lens pair has been adapted separately for matching the reading direction and the visual span for the language read by the wearer.

To this purpose, the proximate vision gaze direction ($\alpha_{PV}$, $\beta_{PV}$) is defined for each lens of a lens pair, that is to say a left proximate vision gaze direction ($\alpha_{PVL}$, $\beta_{PVL}$) for the left-eye lens of the pair and a right proximate vision gaze direction ($\alpha_{PVL}$, $\beta_{PVL}$) for the right-eye lens of the pair.

The right/left proximate vision gaze direction belongs to the right/left meridian line.

Generally, for a progressive lens, the proximate vision gaze direction, and thus $\alpha_{PV}$, is such that the corresponding refractive power is comprised between the prescribed far vision mean power $P_{FV}$ for this lens plus 50% of the addition A prescribed for this lens and the far vision mean power $P_{FV}$ prescribed for this lens plus 125% of the addition prescribed for this lens. Point PV is a proximate vision control point which is defined as the point on the front surface of the lens intersecting the proximate vision gaze direction.

Advantageously, the proximate vision gaze direction, and thus $\alpha_{PV}$, is defined, for each lens of the pair, as the gaze direction where the refracting power reaches the far vision mean power $P_{FV}$ prescribed for this lens plus 85% of the addition A prescribed for this lens or as the gaze direction where the refracting power reaches the far vision mean power $P_{FV}$ prescribed for this lens plus 100% of the addition A prescribed for this lens Second, on each lens of the pair and for each gaze direction ($\alpha$, $\beta$), a refractive power $P_{\alpha,\beta}$ and a module of resulting astigmatism $Asr_{\alpha,\beta}$ are defined.

Then, a left and a right temporal half-width field of refractive power $T_{P\_LE}$, $T_{P\_RE}$ and a left and right nasal half-width field of refractive power $N_{P\_LE}$, $N_{P\_RE}$ are defined respectively for the left-eye lens and the right-eye lens.

For a lens, a temporal half-width field of refractive power $T_P$ is defined as the angular distance, at constant lowering angle $\alpha$, between the proximate vision gaze direction ($\alpha_{PV}$, $\beta_{PV}$) and a gaze direction ($\alpha_{PV}$, $\beta_{TP}$) on the temporal side of the lens where the refractive power $P_{\alpha PV,\beta TP}$ reaches the value of the prescribed far vision mean power $P_{FV}$ for the lens plus three quarters of the prescribed addition A for the lens:

$$P_{\alpha PV,\beta TP} = P_{FV} + 3/4 * A$$

For a lens, a nasal half-width field of refractive power $N_P$ is defined as the angular distance, at constant lowering angle $\alpha$, between the proximate vision gaze direction ($\alpha_{PV}$, $\beta_{PV}$) and a gaze direction ($\alpha_{PV}$, $\beta_{NP}$) on the nasal side of the lens where the refractive power $P_{\alpha PV,\beta NP}$ reaches the value of the prescribed far vision mean power $P_{FV}$ for the lens plus three quarters of the prescribed addition A for the lens:

$$P_{\alpha PV,\beta NP} = P_{FV} + 3/4 * A$$

There is further defined a left and a right temporal half-width field of module of resulting astigmatism $T_{A\_LE}$, $T_{A\_RE}$ and a left and right nasal half-width field of refractive power $N_{A\_LE}$, $N_{A\_RE}$ respectively for the left-eye lens and the right-eye lens.

For a lens, a temporal half-width field of module of resulting astigmatism $T_A$ is defined as the angular distance, at constant lowering angle $\alpha$, between the proximate vision gaze direction ($\alpha_{PV}$, $\beta_{PV}$) and a gaze direction ($\alpha_{PV}$, $\beta_{TA}$) on the temporal side of the lens where the module of resulting astigmatism $Asr_{\alpha PV,\beta TA}$ reaches the value of one quarter of the prescribed addition A for the lens:

$$Asr_{\alpha PV,\beta TA} = A/4$$

For a lens, a nasal half-width field of module of resulting astigmatism $N_A$ is defined as the angular distance, at constant lowering angle $\alpha$, between the proximate vision gaze direction ($\alpha_{PV}$, $\beta_{PV}$) and a gaze direction ($\alpha_{PV}$, $\beta_{NA}$) on the nasal side of the lens where the module of resulting astigmatism $Asr_{\alpha PV,\beta NA}$ reaches the value of one quarter of the prescribed addition A for the lens:

$$Asr_{\alpha PV,\beta NA} = A/4$$

The criteria taken into account in the following are the ratio $R_{PL}$, $R_{PR}$ of the difference over the sum of temporal and nasal half-width fields of refractive power for the left-eye lens and the right-eye lens, and the ratio $R_{AL}$, $R_{AR}$ of the difference over the sum of temporal and nasal half-width fields of module of resulting astigmatism for the left-eye lens and the right-eye lens:

$$R_{PL} = \frac{T_{P\_LE} - N_{P\_LE}}{T_{P-LE} + N_{P\_LE}}$$

$$R_{PR} = \frac{T_{P\_RE} - N_{P\_RE}}{T_{P-RE} + N_{P\_RE}}$$

$$R_{AL} = \frac{T_{A\_LE} - N_{A\_LE}}{T_{A-LE} + N_{A\_LE}}$$

$$R_{AR} = \frac{T_{A\_RE} - N_{A\_RE}}{T_{A-RE} + N_{A\_RE}}$$

For each lens of the pair, at least one criterion is determined based on the reading direction of the wearer, and optionally also based on the length of the perceptual span, that is to say either the ratio for the refractive power $R_P$ or the ratio for the module of resulting astigmatism $R_A$, or both. In particular, for left-to-right reading direction, $R_{PL}<0$ and $R_{PR}>0$ and/or $R_{AL}<0$ and $R_{AR}>0$ These relations result in the fact that, for the left-eye lens LE, the temporal half-width field of refractive power is less than the nasal half-width field of refractive power, and for the right-eye lens RE, the temporal half-width field of refractive power is greater than the nasal half-width field of refractive power. Simultaneously or alternatively, the temporal half-width field of module of resulting astigmatism is less than the nasal half-width field of module of resulting astigmatism for the left-eye lens LE, and the temporal half-width field of module of resulting astigmatism is greater than the nasal half-width field of module of resulting astigmatism for the right-eye lens RE:

$T_{P\_LE}<N_{P\_LE}$ and $T_{P\_RE}>N_{P\_RE}$ and/or $T_{A\_LE}<N_{A\_LE}$ and $T_{A\_RE}>N_{A\_RE}$ In particular, the following relations may be valid:

$R_{PR}+R_{PL}=0$ and/or $R_{AR}+R_{AL}=0$

These equations indicate that the respective near vision zones of both lenses within a pair are shifted laterally using a same shift length. This shift length may be connected to the shift of the center direction of the perceptual span with respect to the character currently read. But other tasks which may be performed by the wearer also implement the near-field vision may be taken into account for determining the shift length of the near vision zone with respect to the proximate vision gaze direction for each lens. Such other task may be sewing, carving, etc. The shift lengths of the near vision zones result from a balance between the comfort provided by the lens pair when performing each of these tasks.

Further, in addition to the above features, the invention provides a pair of lenses, wherein for respectively each lens of the pair, $\Delta<10\%$, with $\Delta=100*abs(Max\_Asr\_N-Max\_Asr\_T)/Max(Max\_Asr\_N;Max\_Asr\_T)$, abs: absolute value, Max_Asr_N: maximum value of resulting astigmatism found over an area of the lens defined by all gaze directions which are comprised:
within the nasal area of the lens, and
within a zone centered on the gaze direction passing through the PRP (Prism reference point) and containing all gaze directions $(\alpha,\beta)$ respecting the following inequality $(\alpha^2+\beta^2)^{1/2} \leq 40°$, Max_Asr_T: maximum value of resulting astigmatism found over an area of the lens defined by all gaze directions which are comprised:
within the temporal area of the lens, and
within a zone centered on the gaze direction passing through the PRP (Prism reference point) and containing all gaze directions $(\alpha,\beta)$ respecting the following inequality $(\alpha^2+\beta^2)^{1/2} \leq 40°$, Max(x;y): maximal value of x and y.

The nasal and temporal sides of the lens are determined with respect to the meridian line of the lens.

Advantageously according to the invention, $\Delta \leq 10\%$, and preferably $\Delta \leq 8\%$, more preferably $\Delta \leq 5\%$. This feature sets a maximum value for the relative imbalance of resulting astigmatism between the nasal and temporal sides of each lens. Correspondingly, even though the values for nasal and temporal half-width fields are asymmetric on a given lens for near (proximate) vision to reflect laterality, this asymmetry is counterbalanced by a relative (controlled) general symmetry of the lens design in terms of peak values of resulting astigmatism. This is particularly advantageous for lens performance in a situation of dynamic vision and/or peripheral vision.

The invention shall be further illustrated by the following examples.

General Description of the Figures of the Examples

Three lens pairs are now described in detail corresponding respectively to the three cases of FIGS. 10a to 10c. All lens pairs correspond to the following prescribed values for both eyes:
prescribed far vision power $P_{FV}$: 0.75 diopter
prescribed addition A: 1.50 diopters For each lens pair, a refractive power map for the right lens RE is first displayed according to the figure order, then a resulting astigmatism map for the same right lens RE is displayed, then the refractive power map for the left lens LE is displayed, and finally the resulting astigmatism map for the left lens LE.

The vertical and horizontal axes of the refractive power maps are the values of the lowering angle $\alpha$ and azimuth angle $\beta$ of the gaze directions. The isometric curves indicated on the refractive power maps connect gaze directions which correspond to a same refractive power value. The respective refractive power values for the curves are incremented by 0.25 $\delta$ between neighbouring curves, and are indicated on some of these curves.

The axes of the resulting astigmatism maps are similar to those of the refractive power maps and the isometric curves indicated on these maps connect gaze directions which correspond to a same resulting astigmatism value.

On each of these maps, three specific points PV, A and B are considered.

Point PV is a proximate vision control point which is defined as the point on the front surface of the lens intersecting the proximate vision gaze direction.

In the examples below, point PV is the point on the front surface of the lens intersecting the gaze direction where the refractive power reaches the far vision mean power prescribed for that lens plus 100% of the addition prescribed for that lens. For both right and left lenses in the three lens pairs below, point PV is thus located on the isometric curve corresponding to the power value $P=0.75+100\%*1.5=2.25$ $\delta$.

Point A is located on the temporal side of the lens such that the distance between point A and point PV corresponds to the temporal half-width field as defined above.

Point B is located on the nasal side of the lens such that the distance between point B and point PV corresponds to the nasal half-width field as defined above.

For both right and left lenses in the three lens pairs below, the isometric curve which connects points A and B corresponds to a resulting astigmatism value Asr=1.5/4=0.375 δ.

FIGS. 11 to 14 thus relate to a first pair corresponding to English language (case of FIG. 10a), FIGS. 15 to 18 relate to a second pair corresponding to Arabic language (case of FIG. 10b), and FIGS. 19 to 22 relate to a third pair corresponding to Chinese language (case of FIG. 10c).

First Lens Pair (for English Language)

For the right lens RE (FIGS. 11 and 12): point PV is located at $\alpha_{PVR}=28.9°$ and $\beta_{PVR}=4.9°$.

Figure 12:
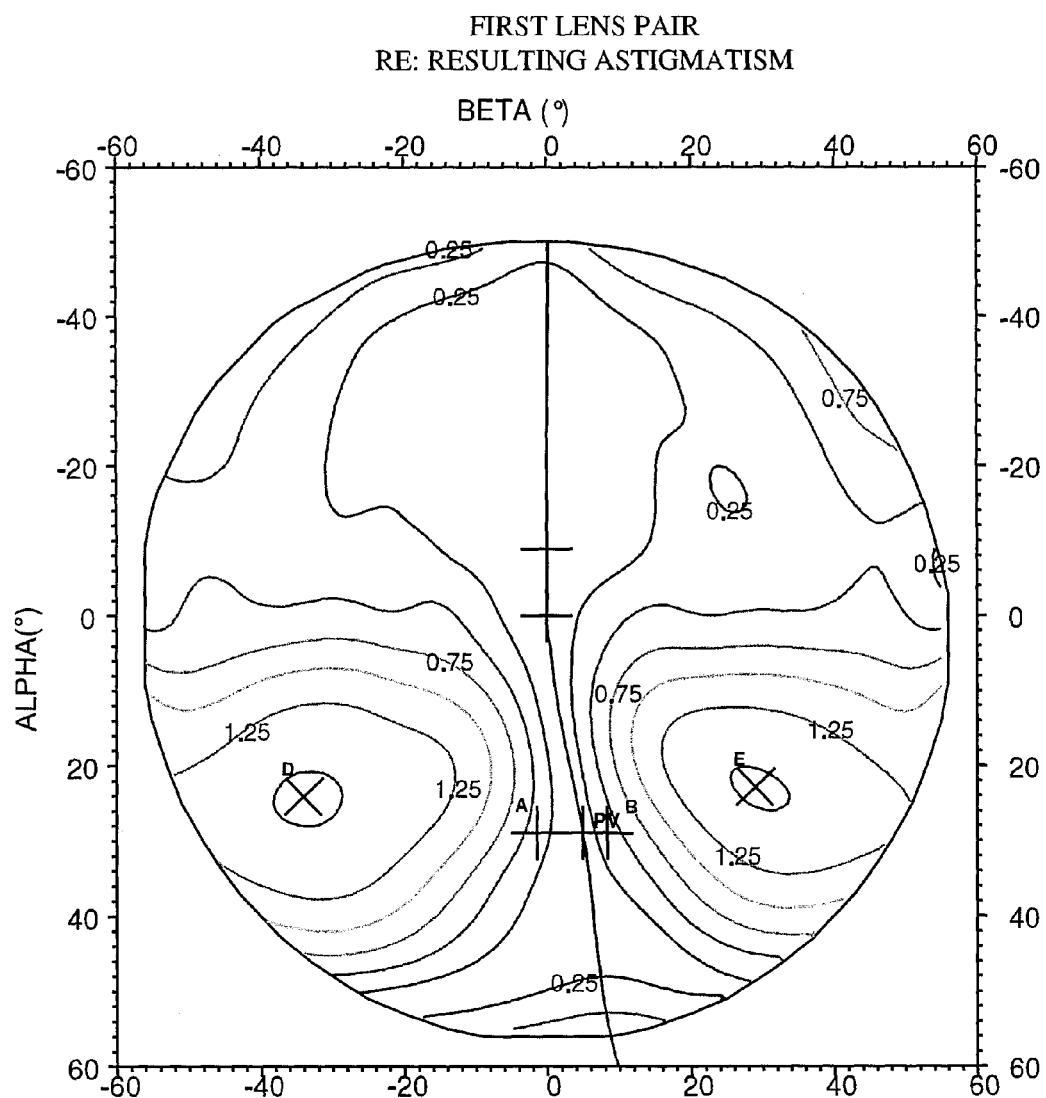
Figure 13:
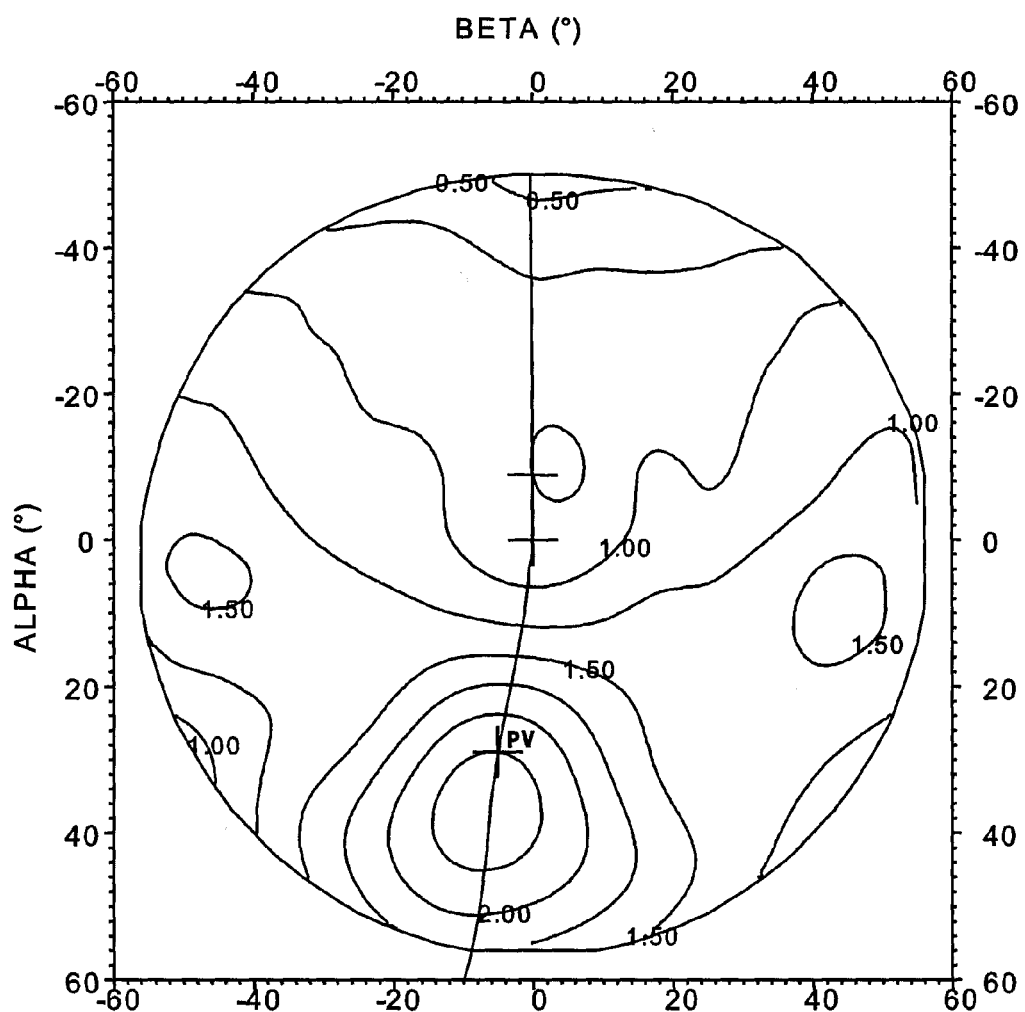

From FIG. 12:
point A is located at $\alpha_{AR}=\alpha_{PVR}=28.9°$ and $\beta_{AR}=-1.4°$
point B is located at $\alpha_{BR}=\alpha\alpha_{PVR}=28.9°$ and $\beta_{BR}=8.4°$
$T_{A\_RE}=6.3°$ and $N_{A\_RE}=3.5°$
Then $R_{AR}=0.28$ For the left lens LE (FIGS. 13 and 14): point PV is located at $\alpha_{PVL}=29.0°$ and $\beta_{PVL}=-4.9°$.

Figure 14:
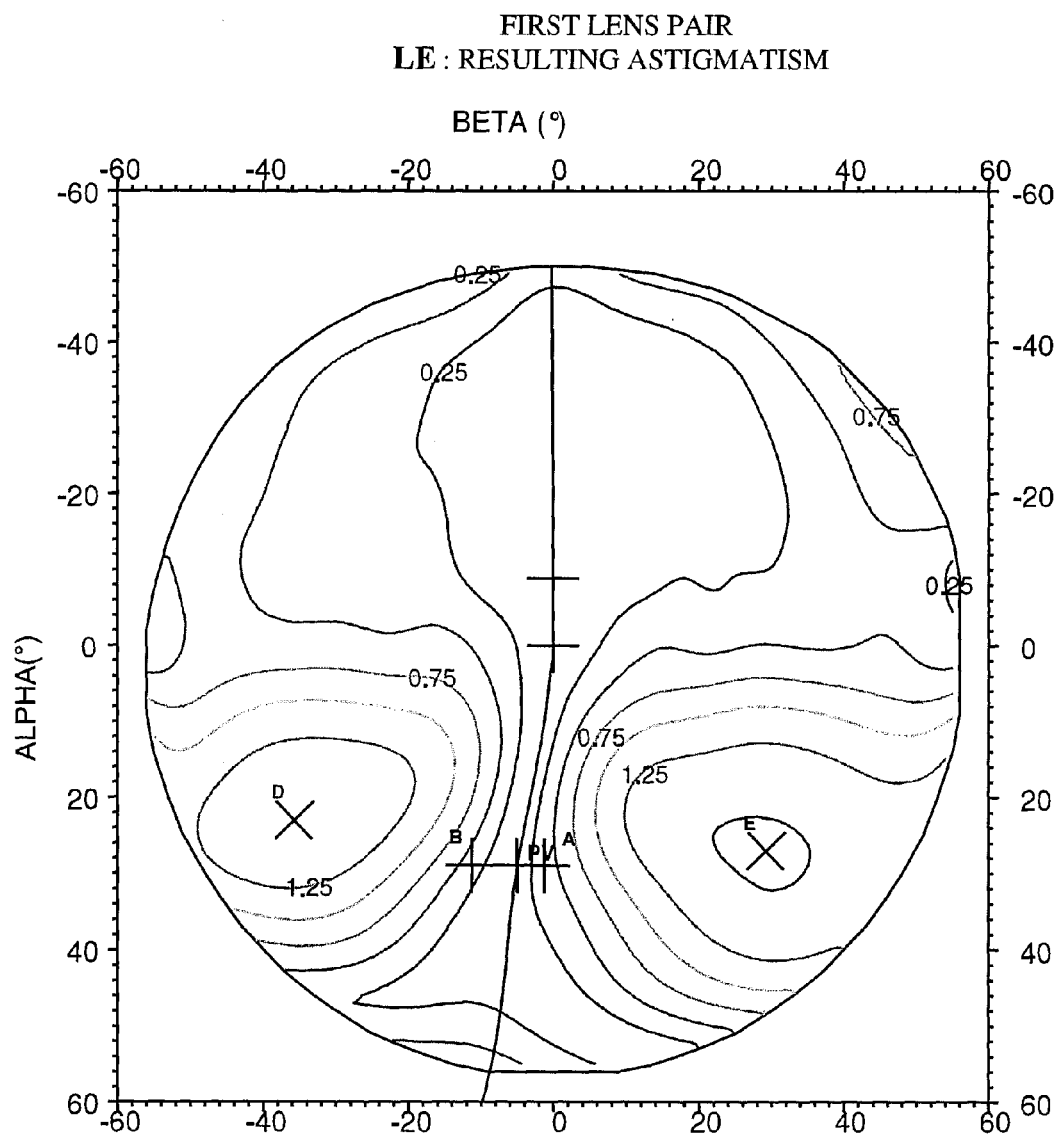
Figure 15:
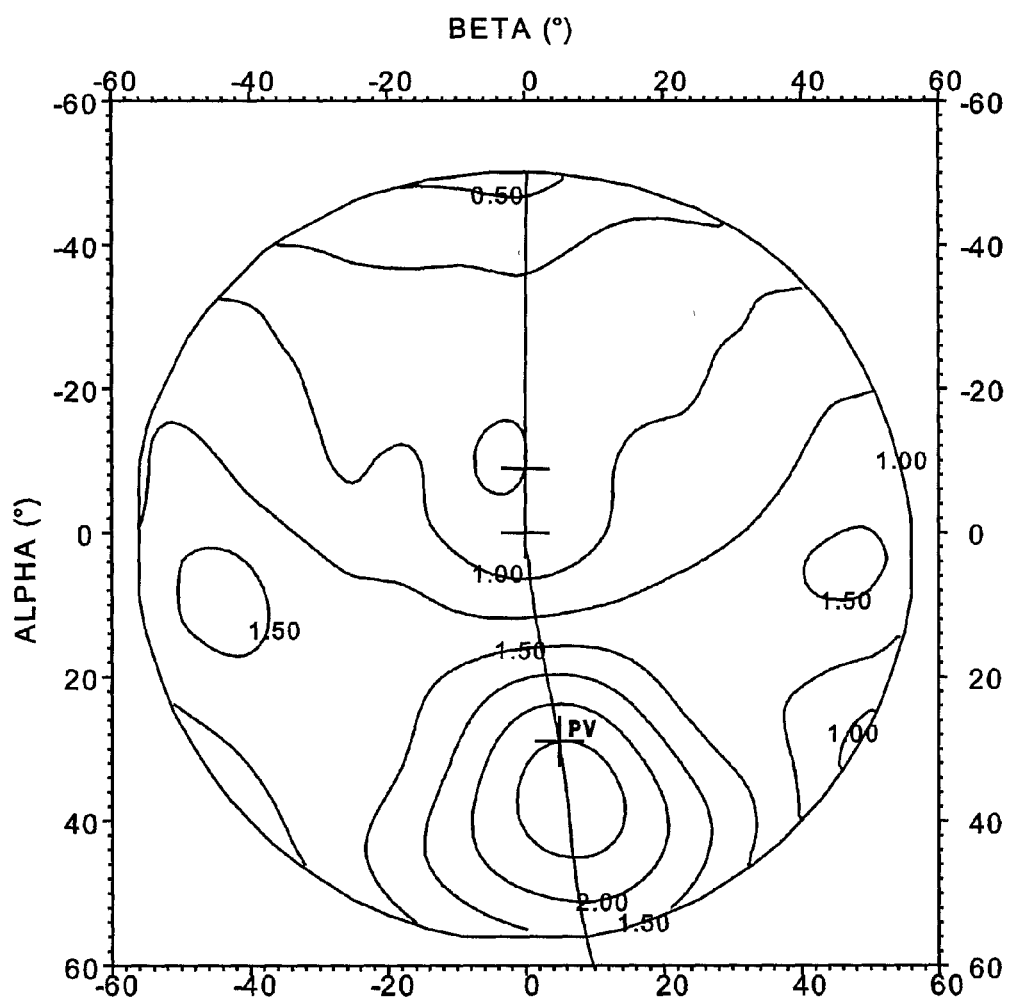
FIGS. 15 to 18 display optical characteristics for a second example of lens pair corresponding to FIG. 10b.

From FIG. 14:
point A is located at $\alpha_{A1}=\alpha_{PVL}=29.0°$ and $\beta_{AL}=-1.2°$
point B is located at $\alpha_{BL}=\alpha_{PVL}=29.0°$ and $\beta_{BL}=-11.3°$
$T_{A\_LE}=3.7°$ and $N_{A\_LE}=6.4°$
Then $R_{AL}=-0.27$ This first lens pair is actually intended for left-to-right reading direction. Indeed, the resulting astigmatism ratios are such that:

$$R_{AR}>0 \text{ and } R_{AL}<0$$

The ratios are further such that $R_{AR}+R_{AL}$ substantially equals 0 taking into account the tolerance range ($R_{AR}+R_{AL}=0.01$).

Further, regarding the resulting astigmatism peaks:
For the right eye (FIG. 12):
Max_Asr_T=1.52 δ, marked as point D located at
β_Max_Asr_T=−34°
α_Max_Asr_T=24°
Max_Asr_N=1.52 δ, marked as point E located at
β_Max_Asr_N=29°
α_Max_Asr_N=23°
in that case Δ=0.0%
For the left eye (FIG. 14):
Max_Asr_T=1.52 δ, marked as point E located at
β_Max_Asr_T=29°
α_Max_Asr_T=27°
Max_Asr_N=1.49 δ, marked as point D located at
β_Max_Asr_N=−36°
α_Max_Asr_N=23°
in that case Δ=2.0%.

Second Lens Pair (for Arabic Language)

For the right lens RE (FIGS. 15 and 16): point PV is located again at $\alpha_{PVR}=28.9°$ and $\beta_{PVR}=4.9°$.

Figure 16:
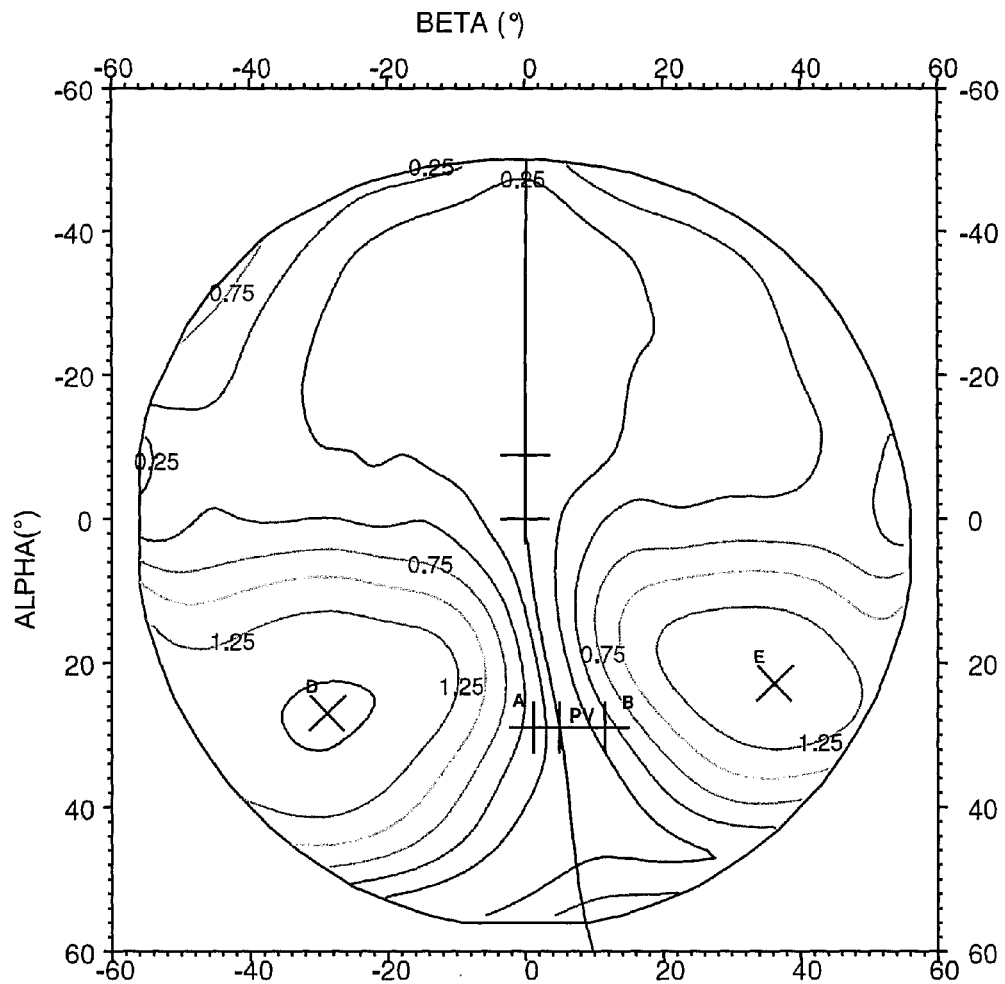
Figure 17:
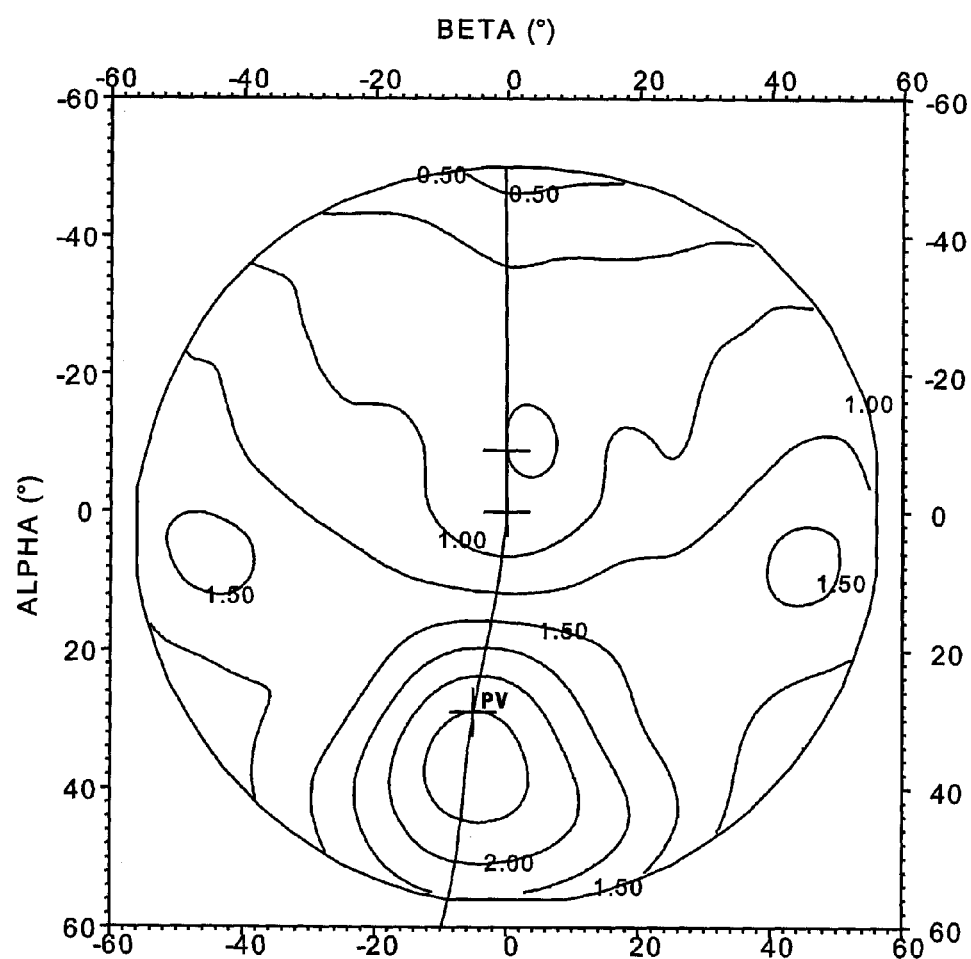

From FIG. 16:
point A is located at $\alpha_{AR}=\alpha_{PVR}=28.9°$ and $\beta_{AR}=1.2°$
point B is located at $\alpha_{BR}=\alpha_{PVR}=28.9°$ and $\beta_{BR}=11.3°$
$T_{A\_RE}=3.7°$ and $N_{A\_RE}=6.4°$
Then $R_{AR}=-0.27$ For the left lens LE (FIGS. 17 and 18): point PV is located at $\alpha_{PVL}=29.0°$ and $\beta_{PVL}=-4.9°$.

Figure 18:
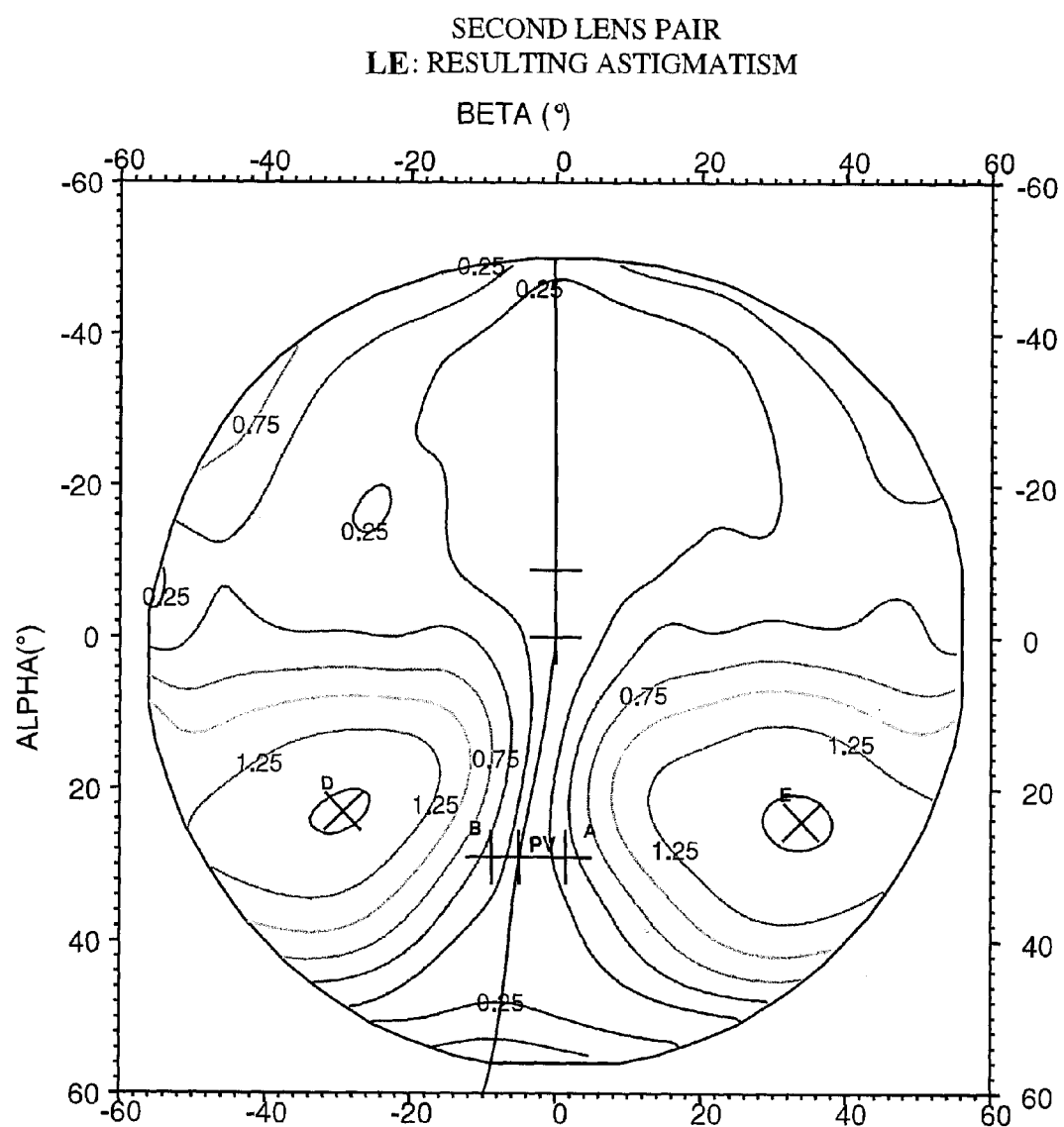
Figure 19:
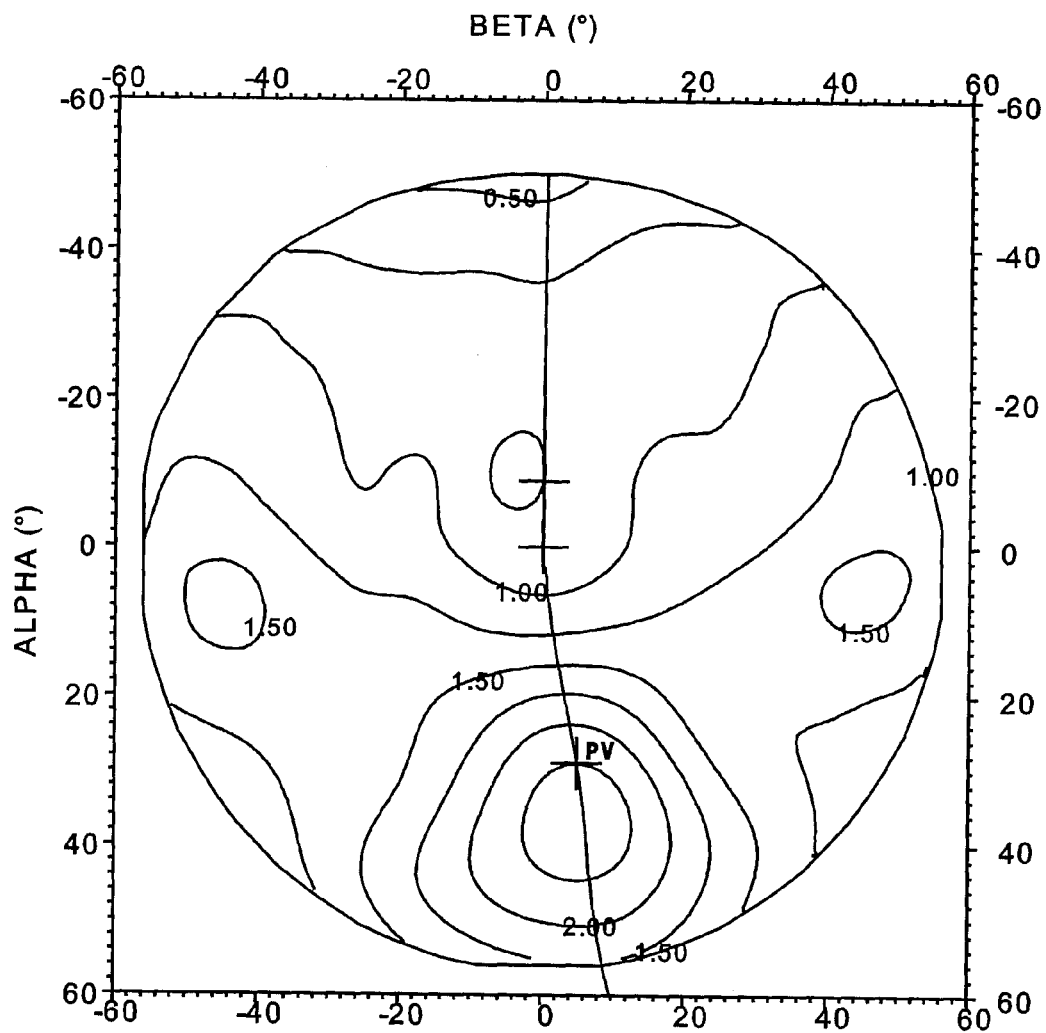
FIGS. 19 to 22 display optical characteristics for a third example of lens pair corresponding to FIG. 10c.
Figure 20:
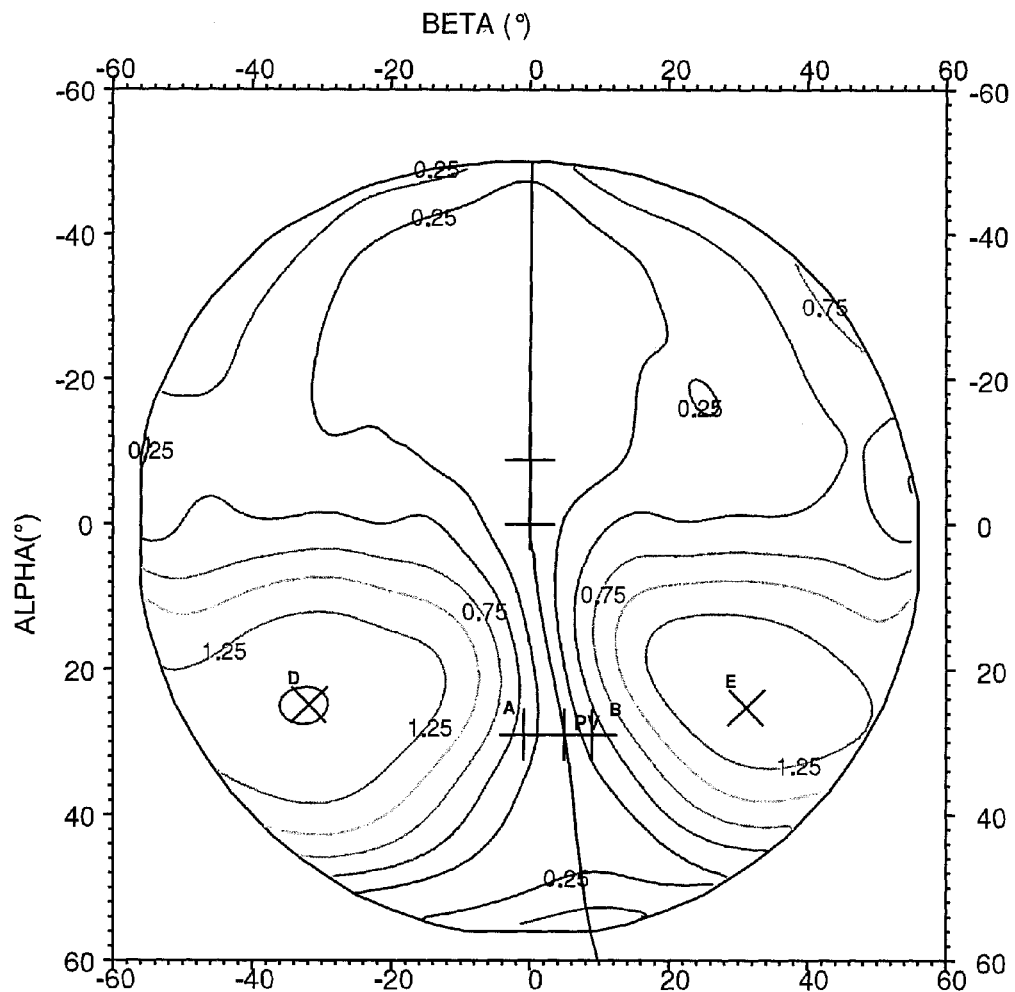
Figure 21:
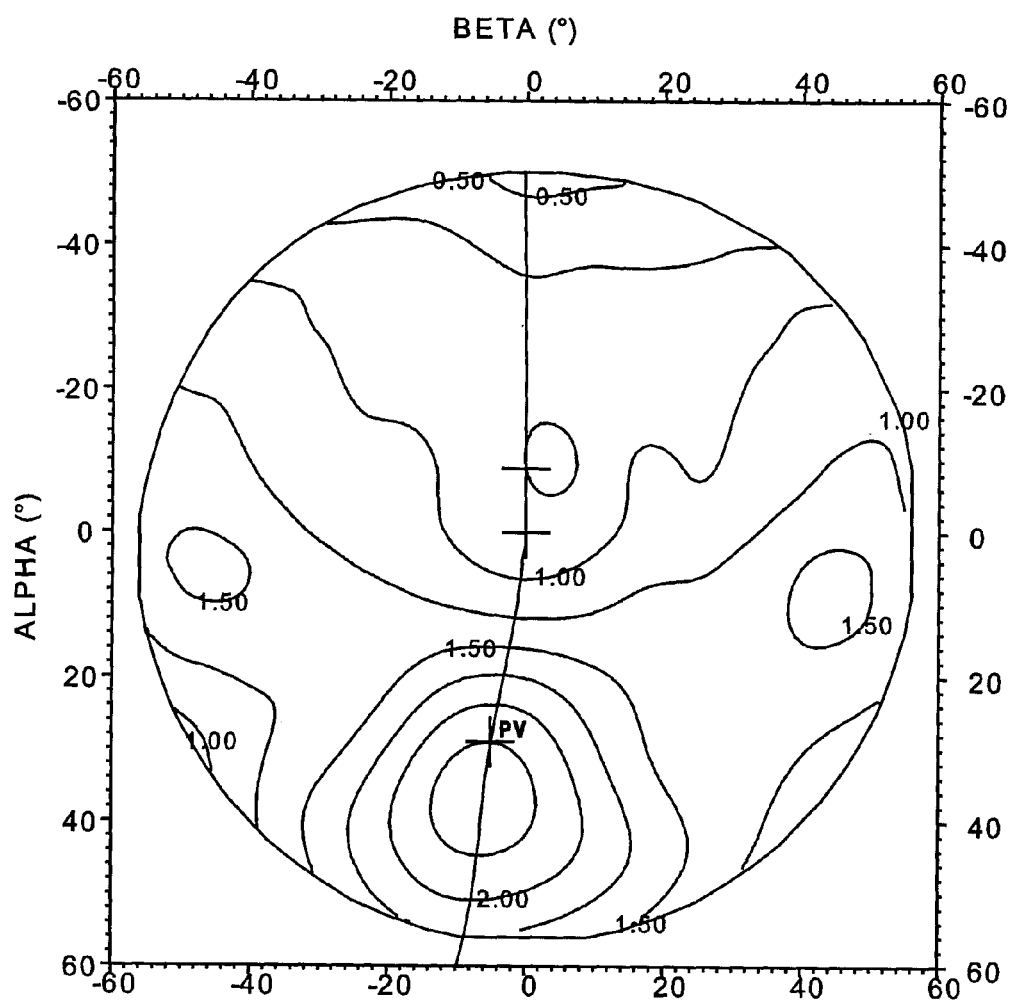

From FIG. 18:
point A is located at $\alpha_{AL}=\alpha_{PVL}=29.0°$ and $\beta_{AL}=1.4°$
point B is located at $\alpha_{BL}=\alpha_{PVL}=29.0°$ and $\beta_{BL}=-8.4°$
$T_{A\_LE}=6.3°$ and $N_{A\_LE}=3.5°$
Then $R_{AL}=0.28$ This second lens pair is actually intended for right-to-left reading direction. Indeed, the resulting astigmatism ratios are such that:

$$R_{AR}<0 \text{ and } R_{AE}>0$$

Again, $R_{AR}+R_{AL}$ substantially equals 0.
Further, regarding the resulting astigmatism peaks:
For the right eye (FIG. 16):
Max_Asr_T=1.52 δ, marked as point D located at
β_Max_Ars_T=−29°
α_Max_Asr_T=27°
Max_Asr_N=1.49 δ, marked as point E located at
β_Max_Asr_N=36°
α_Max_Asr_N=23°
in that case Δ=2.0%
For the left eye (FIG. 18):
Max_Asr_T=1.52 δ, marked as point E located at
β_Max_Asr_T=34°
α_Max_Asr_T=24°
Max_Asr_N=1.52 δ, marked as point D located at
β_Max_Asr_N=−29°
α_Max_Asr_N=23°
in that case Δ=0.0%.

Third Lens Pair (for Chinese Language)

For the right lens RE (FIGS. 19 and 20): point PV is located at $\alpha_{PVR}=29.0°$ and $\beta_{PVR}=5.0°$.

From FIG. 16:
point A is located at $\alpha_{AR}=\alpha_{PVR}=29.0°$ and $\beta_{AR}=-0.7°$
point B is located at $\alpha_{BR}=\alpha_{PVR}=29.0°$ and $\beta_{BR}=9.3°$
$T_{A\_RE}=5.7°$ and $N_{A\_RE}=4.3°$
Then $R_{AR}=0.14$ For the left lens LE (FIGS. 21 and 22): point PV is located at $\alpha_{PVL}=29.1°$ and $\beta_{PVL}=-5.0°$.

Figure 22:
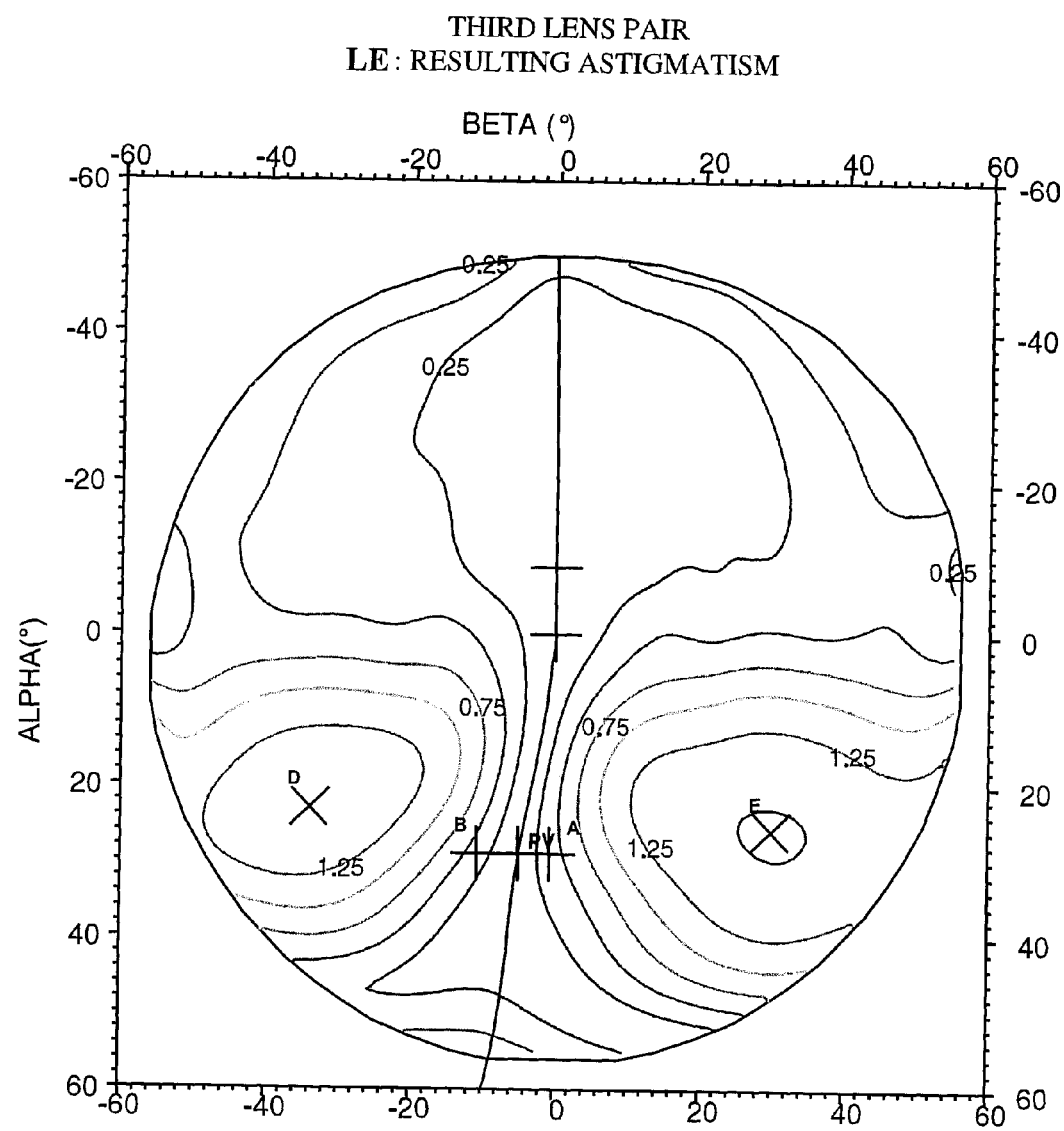

From FIG. 22:
point A is located at $\alpha_{AL}=\alpha_{PVL}=29.1°$ and $\beta_{AL}=-0.6°$
point B is located at $\alpha_{BL}=\alpha_{PVL}=29.1°$ and $\beta_{BL}=-10.8°$
$T_{A\_LE}=4.4°$ and $N_{A\_LE}=5.8°$
Then $R_{AL}=-0.14$ This third lens pair is actually intended for left-to-right reading direction because:

$$R_{AR}>0 \text{ and } R_{AL}<0$$

Again, $R_{AR}+R_{AL}$ substantially equals 0. However, the absolute values of both $R_{AR}$ and $R_{AL}$ are less for this third lens pair when compared to the first lens pair. This is consistent with the third lens pair being intended for Chinese language whereas the first lens pair is intended to English language, since the perceptual span is shorter for Chinese language than for English language.

For the right eye (FIG. 20):
Max_Asr_T=1.51 δ, marked as point D located at
β_Max_Asr_T=−32°
α_Max_Asr_T=25°
Max_Asr_N=1.50 δ, marked as point E located at
β_Max_Asr_N=31°
α_Max_Asr_N=23°
in that case Δ=0.7%
For the left eye (FIG. 22):
Max_Asr_T=1.51 δ, marked as point E located at
β_Max_Asr_T=30°
α_Max_Asr_T=26°
Max_Asr_N=1.48 δ, marked as point D located at
β_Max_Asr_N=−34°
α_Max_Asr_N=23°
in that case Δ=2.0%.

The invention claimed is:

1. A process for determining a pair of progressive ophthalmic lenses comprising the steps of;
   determining a prescribed far vision mean power ($P_{FV}$) for each lens of the pair;
   determining a prescribed addition (A) for each lens of the pair;
   determining a reading direction for a wearer of the lenses;
   defining a temporal side and a nasal side on each lens of the pair;
   defining, on each lens being worn and for each gaze direction, a refractive power ($P_{\alpha,\beta}$) and a module of resulting astigmatism ($Asr_{\alpha,\beta}$), each gaze direction corresponding to a lowering angle ($\alpha$) and to an azimuth angle ($\beta$);
   defining a proximate vision gaze direction ($\alpha_{PV}, \beta_{PV}$) for each lens of the pair;
   defining, for each lens of the pair, a temporal half-width field of refractive power ($T_{P\_LE}$, $T_{P\_RE}$) as the angular distance, at constant lowering angle ($\alpha$), between the proximate vision gaze direction ($\alpha_{PV}, \beta_{PV}$) and a gaze direction ($\alpha_{PV}, \beta_{TP}$) on the temporal side of the lens where the refractive power reaches the value of the prescribed far vision mean power plus three quarters of the prescribed addition ($P_{FV}+\frac{3}{4}*A$);
   defining, for each lens of the pair, a nasal half-width field of refractive power ($N_{P\_LE}$, $N_{P\_RE}$) as the angular distance, at constant lowering angle ($\alpha$), between the proximate vision gaze direction ($\alpha_{PV}, \beta_{PV}$) and a gaze direction ($\alpha_{PV}, \beta_{NP}$) on the nasal side of the lens where the refractive power reaches the value of the prescribed far vision mean power plus three quarters of the prescribed addition ($P_{FV}+\frac{3}{4}*A$);
   defining, for each lens of the pair, a temporal half-width field of module of resulting astigmatism ($T_{A\_LE}$, $T_{A\_RE}$) as the angular distance, at constant lowering angle ($\alpha$), between the proximate vision gaze direction ($\alpha_{PV}, \beta_{PV}$) and a gaze direction ($\alpha_{PV}, \beta_{TA}$) on the temporal side of the lens where the module of resulting astigmatism reaches the value of one quarter of the prescribed addition (A/4);
   defining, for each lens of the pair, a nasal half-width field of module of resulting astigmatism ($N_{A\_LE}$, $N_{A\_RE}$) as the angular distance, at constant lowering angle ($\alpha$), between the proximate vision gaze direction ($\alpha_{PV}, \beta_{PV}$,) and a gaze direction ($\alpha_{PV}, \beta_{NA}$) on the nasal side of the lens where the module of resulting astigmatism reaches the value of one quarter of the prescribed addition (A/4);
   wherein the ratio of the difference over the sum of temporal and nasal half-width fields of refractive power (($T_{P\_LE}-N_{P\_LE}$)/($T_{P\_LE}+N_{P\_LE}$), ($T_{P\_RE}-N_{P\_RE}$)/($T_{P\_RE}+N_{P\_RE}$)) and/or the ratio of the difference over the sum of temporal and nasal half-width fields of module of resulting astigmatism (($T_{A\_LE}-N_{A\_LE}$)/($T_{A\_LE}+N_{A\_LE}$), ($T_{A\_RE}-N_{A\_RE}$)/($T_{A\_RE}+N_{A\_RE}$)) are determined for each lens of the pair based on the reading direction determined for the wearer, and
   wherein the ratio of the difference over the sum of temporal and nasal half-width fields of refractive power (($T_{P\_LE}-N_{P\_LE}$)/($T_{P\_LE}+N_{P\_LE}$), ($T_{P\_RE}-N_{P\_RE}$)/($T_{P\_RE}+N_{P\_RE}$)) and/or the ratio of the difference over the sum of temporal and nasal half-width fields of module of resulting astigmatism (($T_{A\_LE}-N_{A\_LE}$)/($T_{A\_LE}+N_{A\_LE}$), ($T_{A\_RE}-N_{A\_RE}$)/($T_{A\_RE}+N_{A\_RE}$)) are determined for each lens of the pair according to the following rules:
   if the reading direction determined for the wearer is left-to-right, then the ratio of the difference over the sum of temporal and nasal half-width fields of refractive power and/or resulting astigmatism is negative for the left eye lens, and positive for the right eye lens; and
   if the reading direction determined for the wearer is right-to-left, then the ratio of the difference over the sum of temporal and nasal half-width fields of refractive power and/or resulting astigmatism is positive for the left eye lens, and negative for the right eye lens.

2. The process of claim 1, further comprising determining a perceptual span effective for the wearer when looking in a gaze direction, and an azimuth shift between a center direction of the perceptual span and the gaze direction,
   and wherein an absolute value of the ratio of the difference over the sum of temporal and nasal half-width fields of refractive power, for each lens, is an increasing function of an absolute value of the azimuth shift between the center direction of the perceptual span and the gaze direction, and/or
   an absolute value of the ratio of the difference over the sum of temporal and nasal half-width fields of resulting astigmatism, for each lens, is an increasing function of the absolute value of the azimuth shift between the center direction of the perceptual span and the gaze direction.

3. The process of claim 2, further comprising determining whether a language used by the wearer in accordance with the reading direction determined is based on alphabetical or logogram orthography,
   and wherein the perceptual span determined for the wearer is lower for a logogram orthography-based language than for an alphabetical orthography-based language.

4. The process of claim 2, wherein the ratio of the difference over the sum of temporal and nasal half-width fields of refractive power and/or resulting astigmatism, for each lens, is determined so that, when the gaze direction of the wearer is the proximate vision gaze direction, then for the lens
   the center direction of the perceptual span, and
   an average direction of the gaze directions respectively on the temporal side and the nasal side of the lens, where the refractive power reaches the value of the prescribed far vision mean power plus three quarters of the prescribed addition or the module of resulting astigmatism reaches the value of one quarter of the prescribed addition, at constant lowering angle equal to that of the proximate vision gaze direction,
   have an absolute difference of less than 10% of the absolute difference between the gaze directions respectively on the temporal side and the nasal side of the lens, where the refractive power reaches the value of the prescribed far vision mean power plus three quarters of the prescribed addition or the module of resulting astigmatism reaches the value of one quarter of the prescribed addition, at constant lowering angle.

5. The process of claim 4, wherein for each lens and when the gaze direction of the wearer is the proximate vision gaze direction, the absolute difference of
   the center direction of the perceptual span, and
   the average direction of the gaze directions respectively on the temporal side and the nasal side of the lens, where the refractive power reaches the value of the prescribed far vision mean power plus three quarters of the prescribed addition or the module of resulting astigmatism reaches the value of one quarter of the prescribed addition, at constant lowering angle,
   is less than 5% of the absolute difference between the gaze directions respectively on the temporal side and the nasal side of the lens, where the refractive power reaches the value of the prescribed far vision mean power plus three quarters of the prescribed addition or the module of resulting astigmatism reaches the value of one quarter of the prescribed addition, at constant lowering angle.

6. The process of claim 1, wherein the sum of the ratio of the difference over the sum of temporal and nasal half-width fields of refractive power for the right-eye lens and the ratio of the difference over the sum of temporal and nasal half-width fields of refractive power for the left-eye lens is set substantially to zero $((T_{P\_RE}-N_{P\_RE})/(T_{P\_RE}+N_{P\_RE})+(T_{P\_LE}-N_{P\_LE})/(T_{P\_LE}+N_{P\_LE})=0)$.

7. The process of claim 1, wherein the sum of the ratio of the difference over the sum of temporal and nasal half-width fields of module of resulting astigmatism for the right-eye lens and the ratio of the difference over the sum of temporal and nasal half-width fields of module of resulting astigmatism for the left-eye lens is set substantially to zero $((T_{A\_RE}-N_{A\_RE})/(T_{A\_RE}+N_{A\_RE})+(T_{A\_LE}-N_{A\_LE})/(T_{A\_LE}+N_{A\_LE})=0)$.

8. The process of claim 1, wherein the proximate vision gaze direction $(\alpha_{PV}, \beta_{PV})$ is defined, for each lens of the pair, as the gaze direction where the refractive power reaches the prescribed far vision mean power plus 100% of the prescribed addition for said lens of the pair, or the proximate vision gaze direction $(\alpha_{PV}, \beta_{PV})$ is defined, for each lens of the pair, as the gaze direction where the refractive power reaches the prescribed far vision mean power plus 85% of the prescribed addition for said lens of the pair.

9. The process of claim 1, wherein the proximate vision gaze direction belongs to the meridian line of the lens and is such that the corresponding refractive power is comprised between the prescribed far vision mean power $P_{FV}$ for this lens plus 50% of the addition A prescribed for this lens and the far vision mean power $P_{FV}$ prescribed for this lens plus 125% of the addition prescribed for this lens.

10. A computer program product comprising one or more stored sequence of instructions that is accessible to a processor and which, when executed by the processor, causes the processor to carry out the steps of claim 1.

11. A pair of progressive ophthalmic lenses, each lens of the pair having a prescribed far vision mean power ($P_{Fv}$) and a prescribed addition (A) and comprising a temporal side and a nasal side and a proximate vision control point (PV) defined on the front surface, each lens of the pair having, when being worn and for each gaze direction, a refractive power ($P_{\alpha,\beta}$) and a module of resulting astigmatism ($Asr_{\alpha,\beta}$), each gaze direction corresponding to a lowering angle ($\alpha$) and to an azimuth angle ($\beta$), wherein a ratio of the difference over the sum of temporal and nasal half-width fields of refractive power value $((T_{P\_RE}-N_{P\_RE})/(T_{P\_RE}+N_{P\_RE})$, $(T_{P\_LE}-N_{P\_LE})/(T_{P\_LE}+N_{P\_LE}))$ is positive for one of the lenses of the pair and negative for the other lens of the pair, and/or a ratio of the difference over the sum of temporal and nasal half-width fields of module of resulting astigmatism $((T_{A\_RE}-N_{A\_RE})/(T_{A\_RE}+N_{A\_RE})$, $(T_{A\_LE}-N_{A\_LE})/(T_{A\_LE}+N_{A\_LE}))$ is positive for one of the lenses of the pair and negative for the other lens of the pair, with:

a temporal half-width field of refractive power ($T_{P\_LE}$, $T_{P\_RE}$) defined for each lens of the pair as the angular distance, at constant lowering angle ($\alpha$), between the proximate vision control point (PV) and the point on the temporal side of the lens where the refractive power reaches the value of the prescribed far vision mean power plus three quarters of the addition ($P_{FV}+\frac{3}{4}*A$);

a nasal half-width field of refractive power ($N_{P\_LE}$, $N_{P\_RE}$) defined for each lens of the pair as the angular distance, at constant lowering angle ($\alpha$), between the proximate vision control point (PV) and the point on the nasal side of the lens where the refractive power reaches the value of the prescribed far vision mean power plus three quarters of the addition ($P_{FV}+\frac{3}{4}*A$);

a temporal half-width field of module of resulting astigmatism ($T_{A\_LE}$, $T_{A\_RE}$) defined for each lens of the pair as the angular distance, at constant lowering angle ($\alpha$), between the proximate vision control point (PV) and the point on the temporal side of the lens where the module of resulting astigmatism reaches the value of one quarter of the addition (A/4);

a nasal half-width field of module of resulting astigmatism ($N_{A\_LE}$, $N_{A\_RE}$) defined for each lens of the pair as the angular distance, at constant lowering angle ($\alpha$), between the proximate vision control point (PV) and the point on the nasal side of the lens where the module of resulting astigmatism reaches the value of one quarter of the addition (A/4), and wherein for respectively each lens of the pair $\Delta \leq 10\%$, with $\Delta=100* abs(Max\_Asr\_N - Max\_Asr\_T) / Max(Max\_Asr\_N ; Max\_Asr\_T)$, abs: absolute value, Max_Asr_N: maximum value of resulting astigmatism found over an area of the lens defined by all gaze directions which are comprised:
within the nasal area of the lens, and
within a zone centered on the gaze direction passing through the PRP (Prism reference point) and containing all gaze directions ($\alpha$, $\beta$) respecting the following inequality $(\alpha^2+\beta^2)^{1/2} \leq 40°$ Max_Asr_T: maximum value of resulting astigmatism found over an area of the lens defined by all gaze directions which are comprised:
within the temporal area of the lens, and
within a zone centered on the gaze direction passing through the PRP (Prism reference point) and containing all gaze directions ($\alpha$, $\beta$) respecting the following inequality $(\alpha^2+\beta^2)^{1/2} \leq 40°$, Max(x;y): maximal value of x and y.

12. The pair of lenses of claim 11, wherein the sum of the ratio of the difference over the sum of temporal and nasal half-width fields of refractive power for the right-eye lens and the ratio of the difference over the sum of temporal and nasal half-width fields of refractive power for the left-eye lens is substantially equal to 0 $((T_{P\_RE}-N_{P\_RE})/(T_{P\_RE}+N_{A\_RE})+(T_{P\_LE}-N_{P\_LE})/(T_{P\_LE}+N_{P\_LE})=0)$.

13. The pair of lenses of claim 11, wherein the sum of the ratio of the difference over the sum of temporal and nasal half-width fields of module of resulting astigmatism for the right-eye lens and the ratio of the difference over the sum of temporal and nasal half-width fields of module of resulting astigmatism for the left-eye lens is substantially equal to 0 $((T_{A\_RE}-N_{A\_RE})/(T_{A\_RE}+N_{A\_RE})+(T_{A\_LE}-N_{A\_LE})/(T_{A\_LE}+N_{A\_LE})=0)$.

14. The pair of lenses of claim 11, wherein the proximate vision control point is defined, for each lens of the pair, as the point on the front surface intersecting the gaze direction where the refractive power reaches the prescribed far vision mean power plus 100% of the prescribed addition for said lens of the pair, or the proximate vision control point is defined, for each lens of the pair, as the point on the front surface intersecting the gaze direction where the refractive power reaches the prescribed far vision mean power plus 85% of the prescribed addition for said lens of the pair.

* * * * *